United States Patent
Katoh et al.

[11] Patent Number: 6,097,168
[45] Date of Patent: Aug. 1, 2000

[54] POSITION CONTROL APPARATUS AND METHOD OF THE SAME, NUMERICAL CONTROL PROGRAM PREPARATION APPARATUS AND METHOD OF THE SAME, AND METHODS OF CONTROLLING NUMERICAL CONTROL MACHINE TOOL

[75] Inventors: Kooichi Katoh; Michio Matsumoto, both of Numazu; Makoto Sagara, Mishima, all of Japan

[73] Assignee: Toshiba Kikai Kabushiki Kaisha, Tokyo, Japan

[21] Appl. No.: 09/138,605

[22] Filed: Aug. 24, 1998

[30] Foreign Application Priority Data

Aug. 25, 1997 [JP] Japan ................... 9-228552
Sep. 5, 1997 [JP] Japan ................... 9-240758

[51] Int. Cl.$^7$ ................... B25J 9/18
[52] U.S. Cl. ........... 318/568.11; 318/600; 318/573; 318/603; 318/560; 318/646; 318/579; 318/569
[58] Field of Search ................... 318/600, 573, 318/603, 560, 646, 568.11, 574, 569; 364/474.3

[56] References Cited

U.S. PATENT DOCUMENTS 4,209,847  6/1980  Noda et al. ................... 364/900
5,218,281  6/1993  Sasaki et al. ................... 318/600
5,252,805  10/1993  Nakata et al. ................... 318/600

*Primary Examiner*—Karen Masih
*Attorney, Agent, or Firm*—Pillsbury Madison & Sutro LLP

[57] ABSTRACT

A position control apparatus has a target setting unit for setting a target position in a direction of the control axis of the controlled object able to be moved in directions of a plurality of control axes by moving unit; a position control unit for independently positioning the controlled object to the target position in the direction of the control axis set by the target position setting unit; and a position correcting unit for correcting the target positions in directions of other control axes by compensation amounts for correcting positioning derivation in directions of other control axes occurring when positioning the controlled object to a first target position in the direction of one control axis among the plurality of control axes and then reversing the feed direction from that first target position and positioning to a second target position.

25 Claims, 16 Drawing Sheets

$$h \simeq \frac{P^2}{8R} \quad (P \ll R)$$

FIG. 19A $D_{XX}$, $D_{XY}$, $D_{XZ}$ · · · COMPENSATION AMOUNTS WHEN REVERSING FEED DIRECTION OF X-AXIS $D_{YX}$, $D_{YY}$, $D_{YZ}$ · · · COMPENSATION AMOUNTS WHEN REVERSING FEED DIRECTION OF Y-AXIS $D_{ZX}$, $D_{ZY}$, $D_{ZZ}$ · · · COMPENSATION AMOUNTS WHEN REVERSING FEED DIRECTION OF Z-AXIS

FIG. 19B $\delta_{XX}$, $\delta_{XY}$, $\delta_{XZ}$ · · · AMOUNT OF POSITIONING DEVIATION WHEN REVERSING FEED DIRECTION OF X-AXIS $\delta_{YX}$, $\delta_{YY}$, $\delta_{YZ}$ · · · AMOUNT OF POSITIONING DEVIATION WHEN REVERSING FEED DIRECTION OF Y-AXIS $\delta_{ZX}$, $\delta_{ZY}$, $\delta_{ZZ}$ · · · AMOUNT OF POSITIONING DEVIATION WHEN REVERSING FEED DIRECTION OF Z-AXIS

POSITION CONTROL APPARATUS AND METHOD OF THE SAME, NUMERICAL CONTROL PROGRAM PREPARATION APPARATUS AND METHOD OF THE SAME, AND METHODS OF CONTROLLING NUMERICAL CONTROL MACHINE TOOL

BACKGROUND OF THE INVENTION

1. Field of the Invention

The present invention relates to a position control apparatus in a machining center or other numerical control machine tool and a method of the same. More specifically the invention is a position control apparatus for correcting positioning deviations occurring in directions other than a positioning direction due to looseness and other mechanical error of a controlled object.

Further, the present invention relates to a numerical control program preparation apparatus for preparing a numerical control program for running a numerical control console for controlling the driving, for example, a machining center or other numerical control machine tool and a method of the same.

Further, the present invention relates to a method of control of a numerical control machine tool for controlling the driving of a numerical control machine tool.

2. Description of the Related Art

In a machining center, lathe, or other numerical control machine tool, the rotational movement from a servomotor or other rotational drive source is converted to linear movement. The conversion an be accomplished by a feed mechanism comprised of a rack and pinion or, ground ball-nut lead screw. The rotational movement is for moving a work table that clamps a workpiece, a tool for cutting the workpiece, or to a predetermined position.

In recent years, use has been made of a numerical control machine tool having a plurality of control axes, such as five axes, for machining three-dimensional free-formed surfaces of workpieces.

As the system for control of the control axes of such a numerical control machine tool, the so-called full-closed feedback system and semi-closed feedback system are known. The full-closed feedback system is a system for position control by directly setting a linear scale or other position sensor on the work table or other controlled object and feeding back a position signal from the position sensor to the servomotor. With this system, it is possible to directly detect the position of the controlled object, so positioning accuracy of the controlled object is high. With the above system, however, a feed mechanism comprised of a relatively low mechanical rigidity rack and pinion, ground ball-nut lead screw, etc. is interposed between the position sensor and the servomotor, so the frequency of the servo system falls and it is difficult to raise the position loop gain. Accordingly, it is difficult to raise the tracking ability of the servo system.

On the other hand, the semi-closed feedback system is a system for indirect position control of a work table or other controlled object. By mounting a resolver or optical rotary encoder or other rotational position sensor on the servomotor driving the work table, or other controlled object, and feeding back the amount of rotation detected from the rotational position sensor to the servomotor, a system can control the amount of rotation of the servomotor. With this system, there is no feed mechanism comprised of a relatively low rigidity rack and pinion, ground ball-nut lead screw, etc. interposed in the servo loop. Consequently a high natural frequency of the servo system can be obtained and the tracking ability of the servomotor can be increased. The semi-closed feedback system, however, controls the driving of the servomotor in order to indirectly control the position of the work table or other controlled object. When reversing the feed direction in a control axis, mechanical positioning error due to so-called backlash, elastic deformation, etc. present in the ground ball-nut lead screw and other feed mechanisms sometimes occurs. Due to this, positioning error sometimes occurs in the direction of a control axis of the work table or other controlled object. If there is such positioning error in the direction of the control axis of the controlled object, it is difficult to precisely machine the workpiece.

Therefore, the conventional numerical control console for controlling the drive of a numerical control machine tool has a function of correcting positioning error called a "backlash compensation function" for each axis. This "backlash compensation function" measures the difference between a position command (target position) and an actual position of the controlled object by a laser measuring device or other detecting means in advance and adding to the position command a predetermined compensation amount to cancel out the above positioning error in a reverse direction to the feed direction of the control axis. By using the above backlash compensation function, it generally becomes possible to accurately control the position in the direction of the control axis even if backlash or other mechanical error occurs.

In machining centers and other numerical control machine tools having a plurality of control axes, however, there are forces acting between the plurality of control axes; positioning errors sometimes occur in other directions at predetermined control points of the tool, work table, or the like even if correcting the axes by the backlash compensation function.

For example, in a machining center having feed mechanisms in the mutually perpendicular X-, Y-, and Z-axis directions, a workpiece clamped on the table may be machined by a rotary tool attached to a spindle.

When cutting a workpiece by a rotary tool while controlling the feed in a predetermined axial direction, for example, the X-axis direction, the X-axis direction feed mechanism is subject to a force caused by the feeding in the X-axis direction, a reaction force, moment, etc. caused by the cutting force, etc. That is, the guide parts of the X-axis direction feed mechanism is subjected to forces acting in the Y- and Z-axis directions in addition to the force in the X-axis direction.

Normally, there are small clearances and other mechanical error between the moving parts of the feed mechanisms and the guide parts of the feed mechanisms. Further, elastic deformation may occur due to the weight of the numerical control machine tool at the guide parts of the feed mechanisms. Accordingly, if forces act in the Y- and Z-axis directions on the guide parts of the X-axis direction feed mechanism, positioning deviation occurs in not only the X-axis direction, but also the Y- and Z-axis directions.

The positioning deviation in the Y- and Z-axis directions caused in the feeding in the X-axis direction feed mechanism appears as remarkable positioning error in the Y- and Z-axis directions since when the X-axis feed direction is reversed, the direction of force acting on the guide parts of the X-axis direction feed mechanism is reversed.

This positioning error occurs in the same way in the Y- and Z-axis direction feed mechanisms and is caused by the forces acting among the X-, Y-, and Z-axis direction feed mechanisms.

In this way, in the related art, even if backlash and other mechanical error occurring in the different control axis feed mechanisms are corrected by the X-, Y-, and Z-axis direction backlash compensation functions, there was still the above positioning error. The existence of this positioning error has been a cause of shape error in the machined surface of workpieces.

This positioning error can occur in the case of a control system using any of the above semi-closed feedback system or the full-closed feedback system.

For example, when using a ball end mill or other rotary tool mounted along the Z-axis direction for cutting while controlling the feed in the X-axis direction, if positioning deviation occurs from the target position in the Z-axis direction in the workpiece and rotary tool, a large cutting load will act on the ball end mill or other rotary tool, the replacement time of the ball end mill will be quickened, and the machining work will have to be frequently stopped. As a result, the machining time will become longer.

On the other hand, if cutting only when feeding in one direction of the X-axis during the finishing to eliminate the problem caused by variations in the position in the Z-axis direction, the machining time becomes about double that compared with reciprocating cutting when feeding in both directions of the X-axis and the machining time therefore is increased.

Further, the numerical control program for cutting in only the X-axis feed direction becomes complicated and therefore a long time and considerable effort are required for preparation of the numerical control program.

SUMMARY OF THE INVENTION

An object of the present invention is to provide a position control apparatus for correcting positioning deviations in the controlled object of a numerical control machine tool or the like. The position deviations are in the directions of other control axes of the controlled object occurring due to mechanical error of the controlled object. The system and method positions in the direction of one control axis so as to accurately position the controlled object two-dimensionally or three-dimensionally.

Another object of the present invention is to provide a numerical control program preparation apparatus suitable for preparing a numerical control program. The numerical program corrects positioning deviations in the controlled object of a numerical control machine tool or the like. The deviations in the directions of other control axes of the controlled object occur due to mechanical error of the controlled object when positioning in the direction of one control axis so as to accurately position the controlled object two-dimensionally or three-dimensionally and a method for the same.

The position control apparatus according to the present invention has a plurality of position control means for positioning a controlled object. The position controllers are able to be moved in directions of a plurality of control axes by a moving means, of a machine which has the controlled object, to target positions in the directions of the control axes. A first position correcting means outputs control commands to the position control means. The position control means corrects the target positions in the directions of the other control axes of the controlled object, positioning the controlled object to a first target position in the direction of one control axis among the plurality of control axes, and then reversing the feed direction from that first target position and positioning to a second target position.

In the position control apparatus according to the present invention, it is possible to use the first position correcting means to correct the positioning deviations in the directions of other control axes. The deviations occur when positioning a first target position in one control axis and then reversing the feed direction and positioning a second target position. The embodiment makes it possible to accurately position the controlled object two-dimensionally and three-dimensionally.

The numerical control program preparation apparatus according to the present invention has a numerical control program preparing means. The numerical control program preparing means prepares a numerical control program. The numerical control console a numerical control console for controls the positioning of a controlled object, able to be moved in directions of a plurality of control axes by a moving means, of a numerical control machine tool which has that controlled object. A detecting means for detecting a command program, included in the numerical control program, positions a first target position in the direction of one control axis and then reverses the feed direction and positions second target position when reversing the feed direction of one central axis, a numerical control program correcting means inserts into the detected command program a compensation program that corrects the target positions in the directions of the other control axes of the controlled object.

In the numerical control program preparation apparatus according to the present invention, positions a the numerical control console executes a compensation program prepared by the numerical control program correcting means. Thus, it is possible to accurately position the controlled object two-dimensionally and three-dimensionally, even if the numerical control console does not have a function for correcting positioning deviations in the directions of the other control axes.

BRIEF DESCRIPTION OF THE DRAWINGS

These and other objects and features of the present invention will become clearer from the following description of the preferred embodiments given with reference to the attached drawings, in which:

FIG. 7A is a plan view of the state of the machined surface in the ideal state and FIG. 7B is a plan view of the state of the machined surface in the case of positioning deviation occurring in the Z-axis direction;

FIG. 12A is a view of the surface roughness in the case of machining by a position control apparatus according to the present invention, while FIG. 12B is a view of the surface roughness in the case of the related art;

FIG. 17 is a view of an example of a compensation program in a numerical control program preparation apparatus according to the present invention;

FIG. 18 is a view of a program obtained by inserting a compensation program into a numerical control program output from the post processor unit in the numerical control program preparation apparatus according to the present invention;

FIG. 19 is a view listing amounts of positioning deviations and compensation amounts for correcting the amounts of positioning deviations;

FIG. 21 is a view of another example of a compensation program prepared by the numerical control program preparation apparatus according to the present invention.

DESCRIPTION OF THE PREFERRED EMBODIMENTS

Below, a detailed explanation will be given of preferred embodiments of the present invention with reference to the drawings.

First Embodiment

Figure 1:
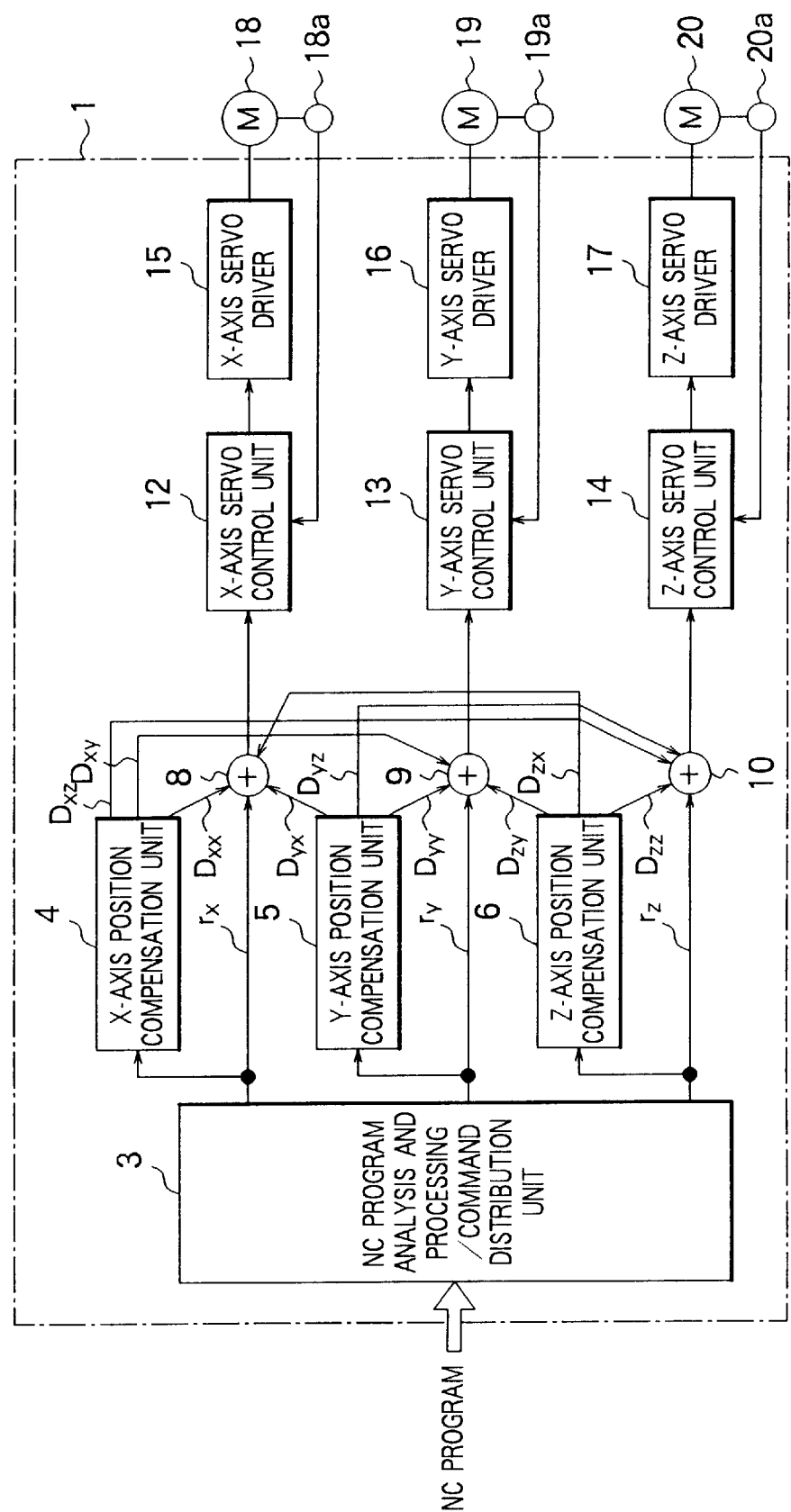
FIG. 1 is a view of the configuration of a first embodiment of a position control apparatus according to the present invention.

FIG. 1 is a view of the configuration of a first embodiment of a position control apparatus according to the present invention.

The position control apparatus 1 illustrated in FIG. 1 has a numerical control program analysis and processing/position command distribution unit 3, X-, Y-, and Z-axis position compensation units 4, 5, and 6, adders 8, 9, and 10, X-, Y-, and Z-axis servo control units 12, 13, and 14, and X-, Y-, and Z-axis servo drivers 15, 16, and 17.

Further, the X-, Y-, and Z-axis servo drivers 15, 16, and 17 have X-, Y-, and Z-axis servomotors 18, 19, and 20 connected to them. The X-, Y-, and Z-axis servomotors 18, 19, and 20 are provided with for example optical rotary encoders and other rotational position sensors 18a, 19a, and 20a.

The numerical control program analysis and processing/position command distribution unit 3 for example analyzes (decodes) and processes the numerical control program which programs the cutter location data of the tool for machining the workpiece etc. by a predetermined language, converts the cutter location data to position commands for movement in the control axes, and distributes these to the control axes.

The position commands $r_x$, $r_y$, and $r_z$ to the control axes are successively output as amounts of movement per predetermined time. These amounts of movement are given for example as amounts of pulses.

The above function is generally provided in numerical control consoles used as position control apparatuses. Further, a numerical control program is generally prepared by a CAD system or automatic programming system and is downloaded to the position control apparatus 1 through a predetermined storage medium or communications means.

The X-, Y-, and Z-axis position compensation units 4, 5, and 6 detect reversal of the X-, Y-, and Z-axis feed directions based on the position commands $r_x$, $r_y$, and $r_z$ received from the numerical control program analysis and processing/position command distribution unit 3.

Reversal of a feed direction is detected by judging whether the previous and current signs of successively input position commands (amounts of movement) are reversed.

The X-axis position compensation unit 4 outputs the compensation amounts $D_{XX}$, $D_{XY}$, and $D_{XZ}$ for correcting the position commands $r_x$, $r_y$, and $r_z$ to the X-, Y-, and Z-axis adders 8, 9, and 10 when detecting the reversal of the input position command $r_x$.

The Y-axis position compensation unit 5 outputs the compensation amounts $D_{YX}$, $D_{YY}$, and $D_{YZ}$ for correcting the position commands $r_x$, $r_y$, and $r_z$ to the X-, Y-, and Z-axis adders 8, 9, and 10 when detecting the reversal of the input position command $r_y$.

The Z-axis position compensation unit 6 outputs the compensation amounts $D_{ZX}$, $D_{ZY}$, and $D_{ZZ}$ for correcting the position commands $r_x$, $r_y$, and $r_z$ to the X-, Y-, and Z-axis adders 8, 9, and 10 when detecting the reversal of the input position command $r_z$.

The X-, Y-, and Z-axis adders 8, 9, and 10 output the position commands $r_x$, $r_y$, and $r_z$ as $r_x+D_{XX}+D_{YX}+D_{ZX}$, $r_y+D_{YY}+D_{XY}+D_{ZY}$, and $r_z+D_{ZZ}+D_{YZ}+D_{XZ}$ to the X-, Y-, and Z-axis servo control units 12, 13, and 14.

Here, an explanation will be given of the above compensation amounts $D_{XX}$, $D_{XY}$, $D_{XZ}$, $D_{YY}$, $D_{YZ}$, $D_{ZX}$, $D_{ZY}$, and $D_{ZZ}$.

The compensation amount $D_{XX}$ output from the X-axis position compensation unit 4 to the X-axis adder 8 is a compensation amount for correcting mechanical positioning error due to the backlash, elastic deformation, etc. existing in the ground ball-nut lead screw and other X-axis direction feed mechanisms.

Similarly, the compensation amounts $D_{YY}$ and $D_{ZZ}$ output from the Y- and Z-axis position compensation units 5 and 6 to the Y- and Z-axis adders 9 and 10 are compensation amounts for correcting the mechanical positioning error due to the backlash, elastic deformation, etc. existing in the ground ball-nut lead screw and other X-axis direction feed mechanisms. Below, these compensation amounts $D_{XX}$, $D_{XY}$, and $D_{ZZ}$ are called "backlash compensation amounts".

These backlash compensation amounts $D_{XX}$, $D_{YY}$, and $D_{ZZ}$ are determined by measuring in advance the mechanical error occurring when reversing the feed directions in the control axes for the controlled object, that is, the machine tool, when assembling and adjusting the machine tool etc.

On the other hand, the compensation amounts $D_{XY}$ and $D_{XZ}$ output to the Y- and Z-axis adders 9 and 10 when the feed direction of the X-axis position command $r_x$ is reversed from the X-axis position compensation unit 4 are compensation amounts for correcting positioning errors occurring in the Y-axis and Z-axis directions when the feed direction of the X-axis position command $r_x$ is reversed.

That is, for example, in a machining center and other numerical control machine tool having a plurality of control axes, when cutting a workpiece by a tool while controlling the feed in the X-axis direction, a force due to the feeding in the X-axis direction and a reaction force and moment occurring due to the cutting force act on the guide parts of the X-axis direction feed mechanism. If force acts in the Y-axis and Z-axis directions of the guide parts of the feed mechanism, positioning errors occur in not only the X-axis direction, but also the Y- and Z-axis directions. Positioning error appears remarkably in the Z-axis direction when the X-axis feed direction is reversed.

The positioning error is the X-axis direction is generally corrected by correcting the position command $r_x$ by the above backlash compensation amount $D_{XX}$, but the positioning errors in the Y- and Z-axis directions end up remaining as they are.

Therefore, in the position control apparatus according to the present invention, when reversing the X-axis feed direction, the position command $r_x$ is corrected by the backlash compensation amount $D_{XX}$ and the positioning errors in the Y- and Z-axis directions are corrected by adding the compensation amounts $D_{XY}$ and $D_{XZ}$ to the Y- and Z-axis position commands $r_y$ and $r_z$ to correct the Y- and Z-axis position commands $r_x$ and $r_z$ so as to correct the positioning errors in the Y- and Z-axis directions.

Accordingly, the backlash and other mechanical errors in the X-axis direction occurring when reversing the X-axis feed direction, and positioning errors occurring in the Y- and Z-axis directions are simultaneously corrected.

Further, the exact same thing as the case of the X-axis applies to the compensation amounts $D_{YX}$ and $D_{YZ}$ output to the X- and Z-axis adders 8 and 10 when the feed direction of the Y-axis position command $r_y$ is reversed from the Y-axis position compensation unit 5 and to the compensation amounts $D_{ZX}$ and $D_{ZY}$ output to the X- and Y-axis adders 8 and 9 when the feed direction of the Z-axis position command $r_x$ is reversed from the Z-axis position compensation unit 6.

Below, the above compensation amounts $D_{XY}$, $D_{XZ}$, $D_{YZ}$, $D_{ZX}$, and $D_{ZY}$ are called "other axial compensation amounts".

Note that the method of determination of the other axial compensation amounts $D_{XY}$, $D_{XZ}$, $D_{YZ}$, $D_{ZX}$, and $D_{ZY}$ will be explained later.

The X-, Y-, and Z-axis servo control units 12, 13, and 14 are comprising position loops, velocity loops, and current loops.

The position loops for example receive the position commands (amounts of movement) of the control axes, perform proportional operations on the errors between these amounts of movement and the position feedback signals from the rotational position detectors 18a, 19a, and 20a detecting the rotational positions of these servomotors 18, 19, and 20 (apply position loop gains), and output the results as the velocity commands to the velocity loops.

The velocity loops for example perform proportional operations and integration operations on the errors between the velocity commands and the difference values (velocity feedback signals) for each sampling time of the position feedback signals from the rotational position detectors 18a, 19a, and 20a to generate torque commands and output the same to the current loops.

The current loops for example perform proportional operations on the errors between the output torque signals of the servomotors 18, 19, and 20 converted from the drive currents of the servomotors 18, 19, and 20 and the torque commands to generate current commands, convert these to predetermined electrical signals, and output these to the servo drivers 15, 16, and 17.

The X-, Y-, and Z-axis servo control units 12, 13, and 14 are realized by software in the present embodiment, but may also be realized by hardware.

The X-, Y-, and Z-axis servo drivers 15, 16, and 17 output drive currents obtained by amplifying the current commands from the X-, Y-, and Z-axis servo control units 12, 13, and 14 to the X-, Y-, and Z-axis servomotors 18, 19, and 20.

The X-, Y-, and Z-axis servomotors 18, 19, and 20 are driven in accordance with these drive currents. The rotational position detectors 18a, 19a, and 20a provided in the X-, Y-, and Z-axis servomotors 18, 19, and 20 output detection pulses based on the amounts of rotation of the X-, Y-, and Z-axis servomotors 18, 19, and 20 to the X-, Y-, and Z-axis servo control units 12, 13, and 14.

As the rotational position detectors 18a, 19a, and 20a, for example, incremental type rotary encoders or absolute type rotary encoders may be used. When using incremental type rotary encoders, the rotary encoders output position signals with each rotation as pulse signals, so by managing the numbers of the rotational pulse signals in the X-, Y-, and Z-axis servo control units 12, 13, and 14, the absolute positions of the X-, Y-, and Z-axis servomotors 18, 19, and 20 can be managed.

Due to the above configuration, control of the rotational positions of the X-, Y-, and Z-axis servomotors 18, 19, and 20 becomes possible.

Note that the position control apparatus 1 can not only control the rotational positions of the X-, Y-, and Z-axis servomotors 18, 19, and 20, but can also control the speed and control the torque, but details of these operations will be omitted.

Further, the position control apparatus 1 can control more control axes than the X-, Y-, and Z-axis servomotors 18, 19, and 20 and for example has the function of controlling the rotational speeds of the spindle motors etc.

Figure 2:
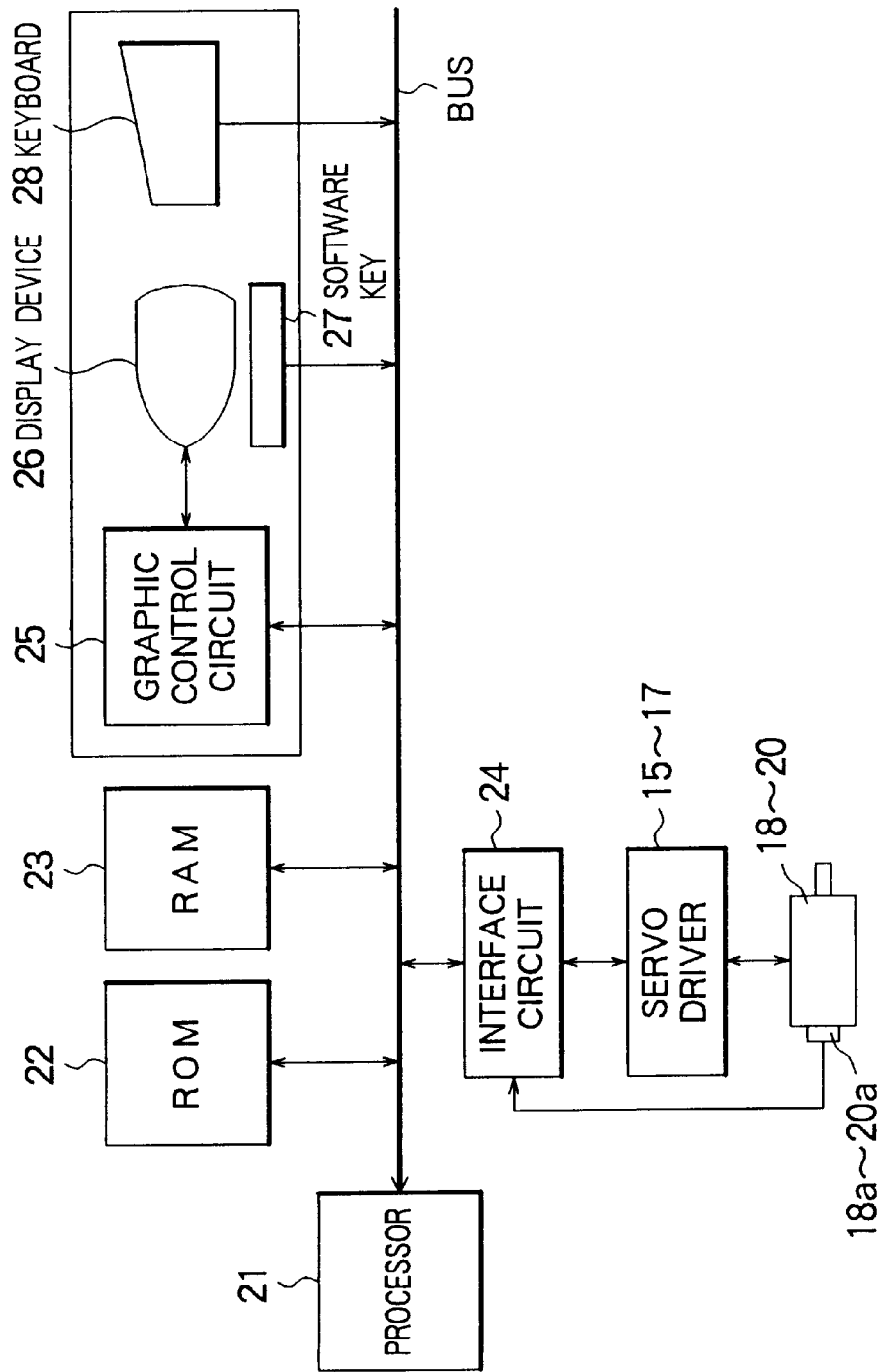
FIG. 2 is a view of the configuration of an example of hardware constituting the position control apparatus 1 illustrated in FIG. 1.

The position control apparatus 1 illustrated in FIG. 1 can for example be configured by adding predetermined software to the hardware of the configuration illustrated in FIG. 2.

The microprocessor 21 illustrated in FIG. 2 is connected through a bus to a ROM (read only memory) 22, a RAM (random access memory) 23, an interface circuit 24, a graphic control circuit 25, a display 26, a keyboard 28, a software key 27, etc.

The microprocessor 21 controls the position control apparatus 1 as a whole according to a system program stored in the ROM 22.

The ROM 22 has stored in it programs for realizing the above numerical control program analysis and processing/position command distributor 3, X-, Y-, and Z-axis position compensation units 4, 5, and 6, adders 8, 9, and 10, X-, Y-, and Z-axis servo control units 12, 13, and 14, etc. and a system program for controlling the position control apparatus 1 as a whole.

The RAM 28 downloads programs stored in the ROM 22, stores various types of numerical control programs, data, etc., and for example stores the later explained compensation amount data etc.

The graphic control circuit 25 converts digital signals to display signals and gives them to the display 26.

For the display 26, for example, a CRT display or a liquid crystal display is used. The display 26 displays shapes, machining conditions, generated machining programs, etc. when the software key 27 or keyboard 28 is used by an operator to prepare a machining program by a dialog mode.

The worker can input data in accordance with the content displayed on the display 26 (dialog type data input screen) to prepare a machining program.

The screen of the display 26 displays the work or data received on the screen by a menu format. Which item is selected in the menu is determined by depressing a software key 27 at the bottom of the menu.

The keyboard 28 is used for inputting the data required for the position control apparatus 1.

The interface circuit 24 converts the position commands or other commands output from the microprocessor 21 to predetermined signals which it outputs to the X-, Y-, and Z-axis servo drivers 15, 16, and 17.

The interface circuit 24 sequentially counts for example the detection pulses from the position detectors 18a, 19a, and 20a provided in the X-, Y-, and Z-axis servomotors 18, 19, and 20, converts the results to predetermined digital signals, and outputs the same to the microprocessors 21.

Figure 3:
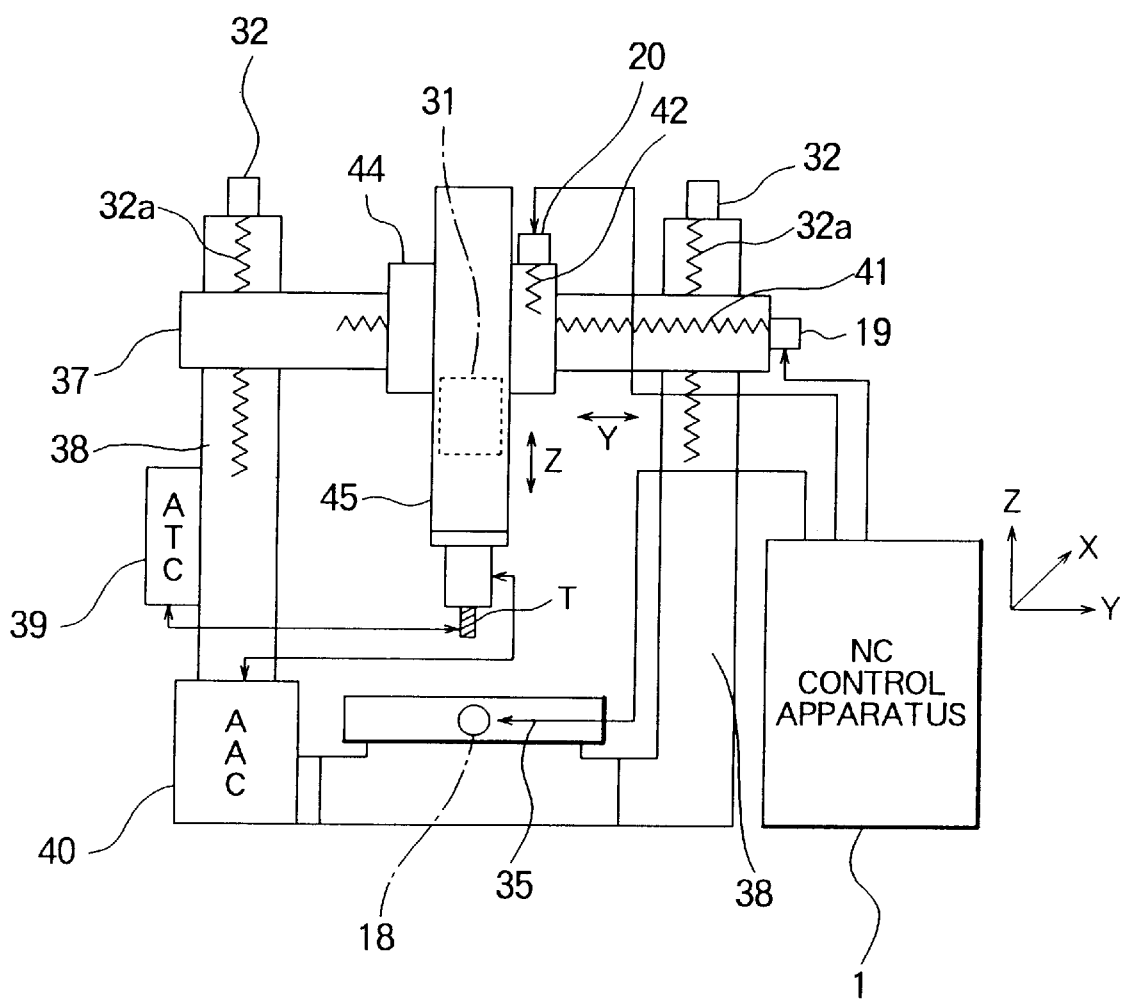
FIG. 3 is a view of the configuration of an example of a machining center as a numerical control machine tool to which the position control apparatus according to the present invention is applied.

FIG. 3 is a view of the configuration of an example of a machining center as a numerical control machine tool to which the position control apparatus according to the present invention is applied.

The machining center illustrated in FIG. 3 is a so-called double housing type machining center. A spindle 45 is provided movably in the vertical direction (Z-axis direction) through a moving part 44 movably supported on a cross rail 37, which cross rail 37 is movably supported at the two ends by the double housing type column 38.

The moving part 44 is formed with a not shown female thread portion passing through the cross rail 37 in the horizontal direction. The lead screw 41 is screwed into this. At the end of the lead screw 41 is provided a Y-axis servomotor 19. The lead screw 41 is driven to rotate by the Y-axis servomotor 19.

By the rotational drive of the lead screw 41, the moving part 44 becomes able to move in the Y-axis direction. The spindle 45 is moved in the Y-axis direction by this.

The moving part 44 is formed with a not shown female thread portion passing through the cross rail 37 in the vertical direction. The lead screw 42 is screwed into this. At the end of the lead screw 42 is provided a Z-axis servomotor 20. The lead screw 42 is driven to rotate by the Z-axis servomotor 20. By this, the spindle 45 provided movably at the moving part 44 is moved in the Z-axis direction.

In the spindle 45 is housed a spindle motor 31. The spindle motor 31 drives the rotation of the end mill or other tool T mounted on the front end of the spindle 45.

Below the spindle 45, an X-axis table 35 is provided movably in the X-axis direction. The X-axis table 35 is formed with a female thread portion (not shown) which is connected to an X-axis servomotor 18 through a feed mechanism comprised by a lead screw provided along the X-axis direction.

The X-axis table 35 is moved in the X-axis direction by the rotational drive of the X-axis servomotor 18.

The above X-, Y-, and Z-axis servomotors 18 are controlled by the position control apparatus 1.

The double-housing type column 38 is formed with not shown female threaded portions. The cross rail 37 is raised and lowered by driving the rotation of the lead screw 32a screwed in it by a cross rail elevation motor 32.

The tool T can be changed with various types of other tools by an automatic tool changer (ATC) 39. Various attachments may also be changed by an automatic attachment changer (AAC) 40.

Next, an explanation will be given of an example of cutting a workpiece, for example, a die, by the above machining center.

Figure 4:
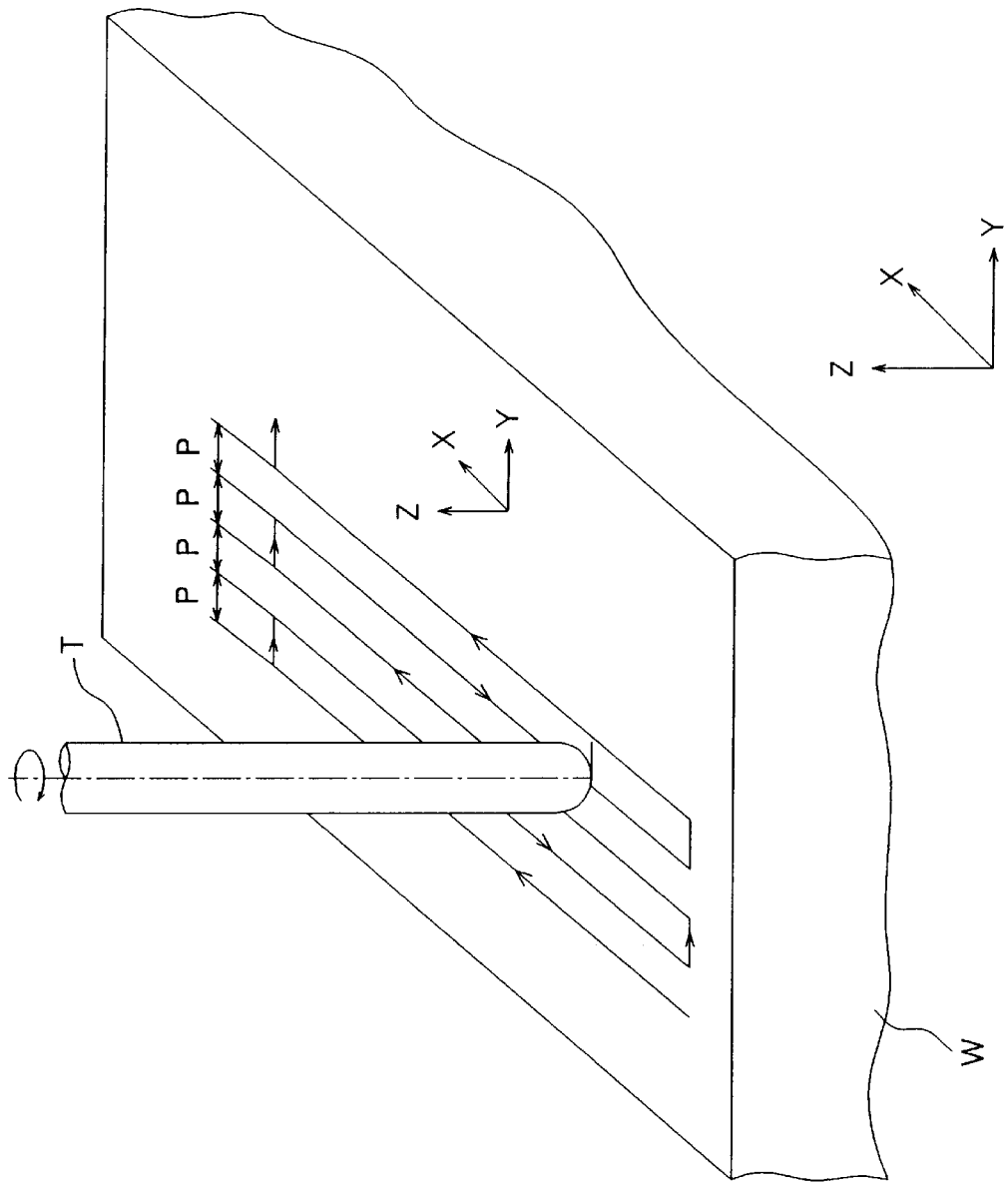
FIG. 4 is a perspective view of the state of finishing by a ball end mill a workpiece clamped on an X-axis table of a machining center.

FIG. 4 is a perspective view of the state of finishing a workpiece W clamped on an X-axis table 35 of a machining center by a ball end mill T.

When finishing a surface of the workpiece W, as illustrated in FIG. 4, positioning is performed in the Z-axis direction so that the depth of cut by the ball end mill T becomes a predetermined amount. The cutting is performed by the ball end mill T rotated at a predetermined rotational speed by the spindle motor 31 while moving the X-axis table 35 (workpiece W) in the X-axis direction at a predetermined feed rate.

At a predetermined position in the X-axis direction, the ball end mill T is made to move in the Y-axis direction by a pick feed amount P. The ball end mill T is made to move in the opposite direction of the X-axis at a similar feed rate. By repeating this operation, a surface of the workpiece W is finished.

Figure 5:
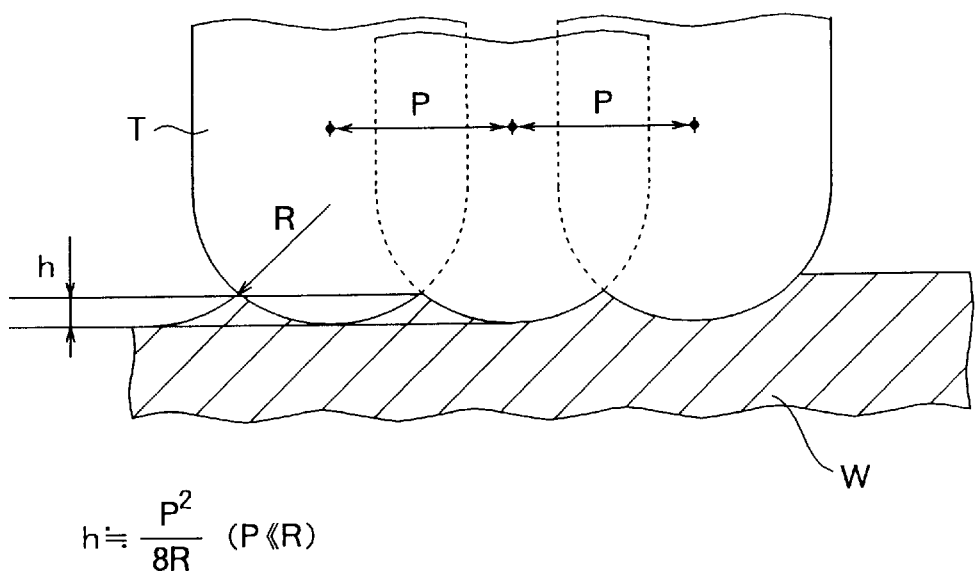
FIG. 5 is a view for explaining the surface roughness of a machined surface finished by a machining center.

FIG. 5 is a view for explaining the surface roughness of a machined surface finished by a machining center.

When the cutting is performed while making the ball end mill T move in the Y-axis direction by the pick feed amount P, as shown in FIG. 5, ideally the cut surface is formed with a wave shape.

The distance h between the highest portion and the lowest portion of the cut surface at this time is made the surface roughness.

The surface roughness h is ideally expressed by the following formula (1):

$$h \approx P^2/8R \quad (P<<R) \tag{1}$$

Here, R is the radius of curvature of the front end of the ball end mill.

The smaller the surface roughness h, the higher the planar accuracy of the machined surface. For example, in the case of a die, if the surface roughness h can be made extremely small, it is possible to eliminate the polishing process in the post processing and thereby streamline the polishing process.

In the finishing by a machining center of the related art, however, there was the problem that it was not possible to make the surface roughness h small.

This has been due to the occurrence of positioning deviation in the Z-axis direction between the ball end mill T and the workpiece W, that is, deviation from the target relative position between the ball end mill T and the workpiece W, when reversing the feed direction from the +X-axis direction to the −X-axis direction or reversing the feed direction from the −X-axis direction to the +X-axis direction when making the X-axis table 35 (workpiece W) reciprocate in the X-axis direction at a predetermined feed rate.

The positioning deviation $\delta_Z$ in the Z-axis direction between the ball end mill T and the workpiece W is considered to cause positioning deviation in the Z-axis direction in the feed mechanisms of the X-axis table 35 etc. since the cutting force received by the workpiece W from the ball end mill T and the force acting when the X-axis table 35 moves change when the feed direction is reversed.

Further, the positioning deviation $\delta_Z$ in the Z-axis direction between the ball end mill T and the workpiece W is substantially equal in magnitude but reverse in direction between the case of reversing the X-axis table 35 from the +X-axis direction to the −X-axis direction and the case of reversing it from the −X-axis direction to the +X-axis direction.

Accordingly, even if correcting the backlash and other mechanical error in the X-axis direction, the surface roughness h cannot be made small.

Further, if positioning deviation $\delta_Z$ in the Z-axis direction explained above occurs, a large cutting load acts on the ball end mill T in one feed direction, the replacement time of the ball end mill is quickened, and the machining frequently has to be stopped, so as a result there is the inconvenience that the machining time ends up becoming long.

Figure 6:
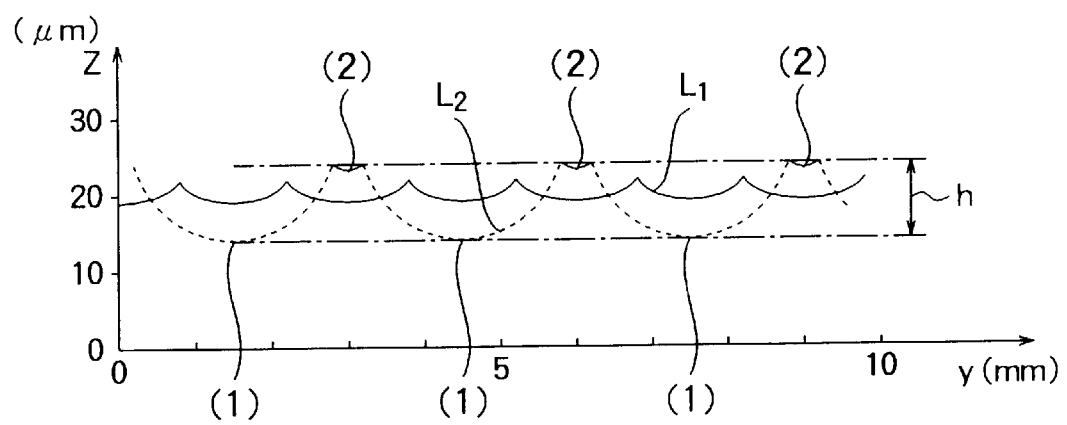
FIG. 6 is a view of the state of a machined surface in the case of cutting a workpiece by a ball end mill.

FIG. 6 is a view of the state of a machined surface in the case of cutting a workpiece by a ball end mill. The solid line L1 shows the case of the ideal state, while the broken line L2 in the figure shows the case of occurrence, in the positive and negative directions, of positioning deviation $\delta_Z$ of the Z-axis direction between the ball end mill T and the workpiece W. Note that the Z-axis shows relative amounts.

When positioning deviation $\delta_Z$ of the Z-axis direction between the ball end mill T and the workpiece W occurs in the positive and negative directions, as shown by the broken line L2, the depth of out in the Z-axis direction becomes larger in one feed direction of the X-axis (region of (1) in the figure), while the depth of cut in the Z-axis direction becomes smaller in the other feed direction of the X-axis (region of (2) in the figure).

Therefore, when the positioning deviation $\delta_Z$ of the Z-axis direction between the ball end mill T and the workpiece T occurs in the positive and negative directions, the surface roughness h increases compared with the ideal state.

Figure 7A:
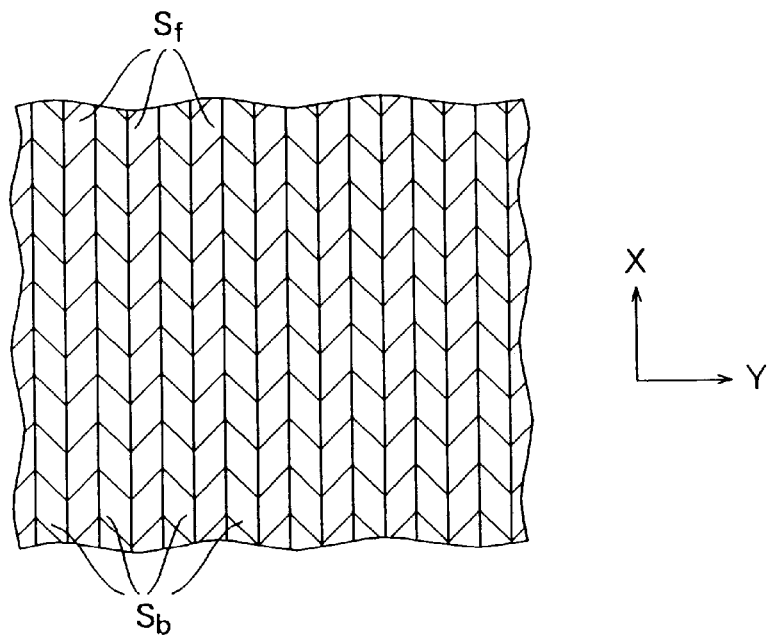
FIGS. 7A and 7B are views of the state of the machined surface of a workpiece, where
Figure 7B:
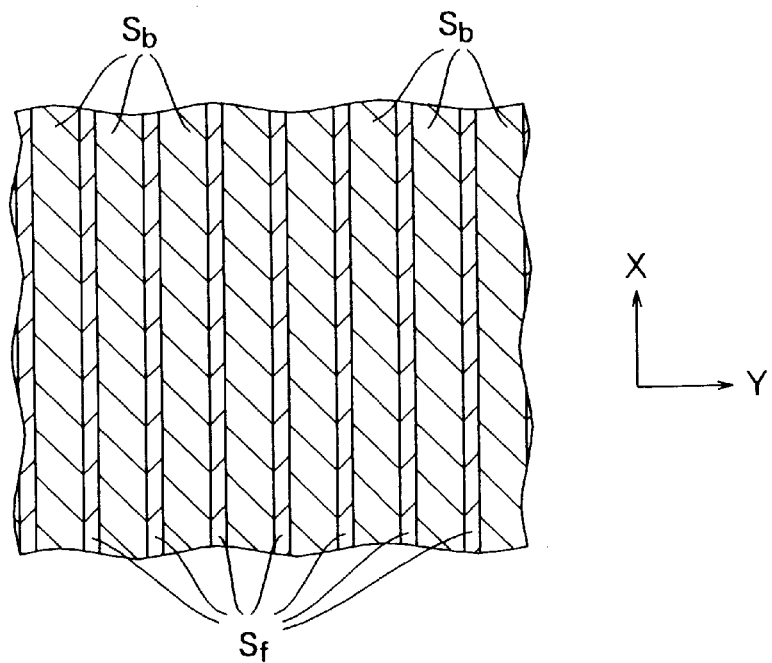

Further, FIGS. 7A and 7B are views of the state of the machined surface of a workpiece, where FIG. 7A is a plan view of the state of the machined surface in the ideal state and FIG. 7B is a plan view of the state of the machined surface in the case of positioning deviation occurring in the Z-axis direction.

As shown in FIG. 7A, ideally, the cut surfaces Sf and Sb of opposite feed directions of the X-axis (opposite directions) are formed at substantially equal intervals.

On the other hand, as shown in FIG. 7B, when the positioning deviation $\delta_Z$ of the Z-axis direction between the ball end mill T and the workpiece W occurs in the positive and negative directions, the width in the Y-axis direction of one cut surface Sf becomes thicker, while the width of the other cut surface Sb becomes thinner.

Accordingly, it is possible to confirm the quality of the machined surface even visually since the appearance of the cut surface differs between the case of the ideal state and the case where positioning deviation $\delta_Z$ of the Z-axis direction between the ball end mill T and the workpiece W occurs in the positive and negative directions.

The above problem can be solved by controlling the drive of the machining center of the above configuration by the position control apparatus 1 according to the present invention.

Figure 8:
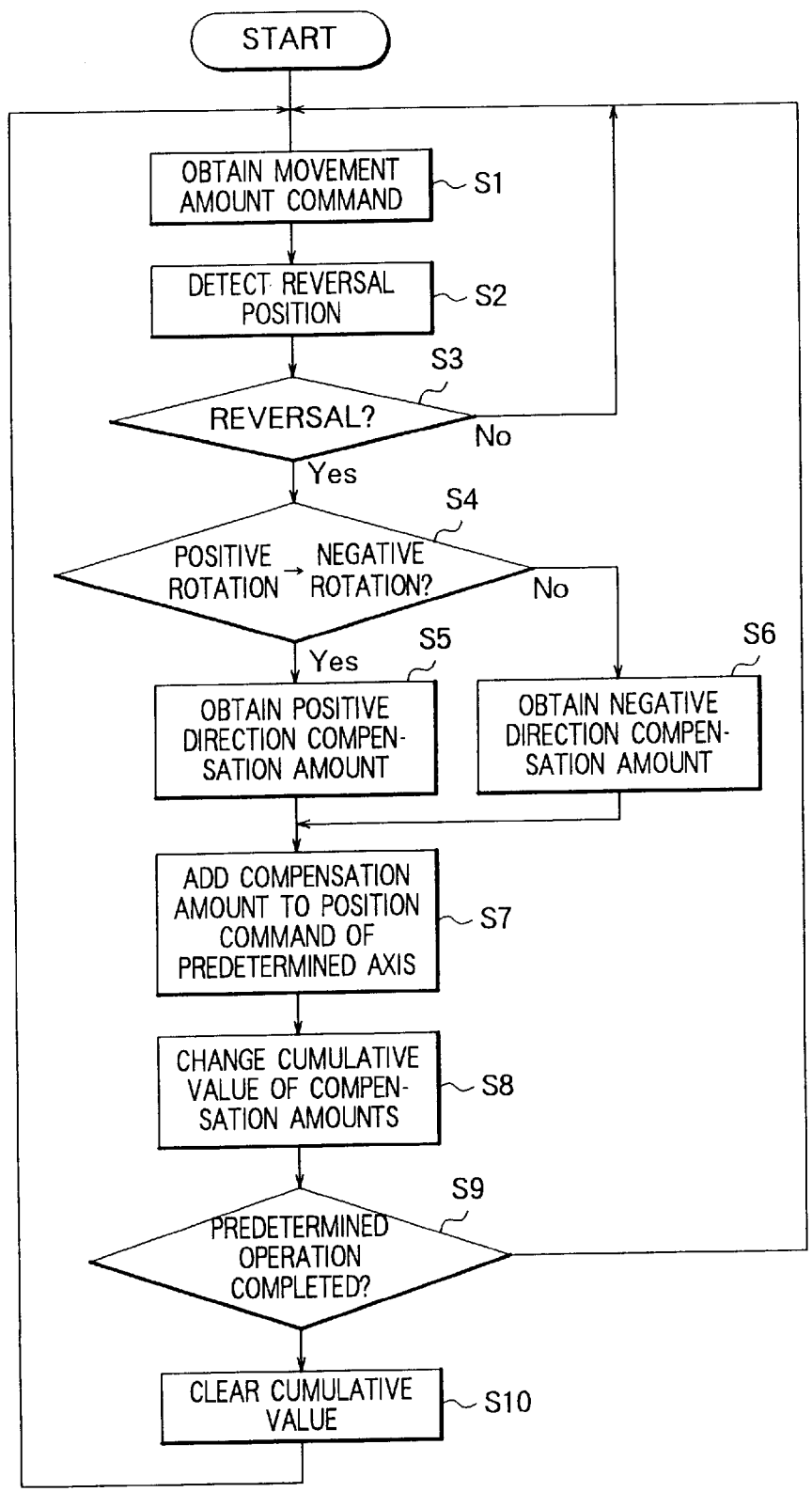
FIG. 8 is a flow chart for explaining the operation of the numerical control console according to the present invention.

FIG. 8 is a flow chart for explaining the operation of the numerical control console according to the present invention. The following explanation will be given based on the flow chart shown in FIG. 8.

For example, the numerical control program is read from the recording tape, floppy disk, or other storage medium to the position control apparatus and stored in the RAM 23.

The numerical control program analysis and processing/command distribution unit 3 analyzes and processes the above numerical control program and distributes the position commands $r_x$, $r_y$, and $r_z$ to the control axes.

The position commands $r_x$, $r_y$, and $r_z$ distributed to the control axes are successively input to the X-, Y-, and Z-axis position command compensation units 4, 5, and 6 as amounts of movement per predetermined time (step S1).

Next, the different axial position command compensation units 4, 5, and 6 detect whether the feed directions of the axes have reversed based on the input amounts of the movements (step S2).

Whether or not they have reversed is judged by detecting whether the signs of the position command pulses have reversed.

Accordingly, when the signs of the previously input amount of movement and the currently input amount of movement differ, it is judged that the command is one of a reversed feed direction.

When not reversed, the position command is again obtained (step S3).

When the feed directions of the position commands $r_x$, $r_y$, and $r_z$ have reversed, for example, in the case of the X-axis, it is judged if it is a reversal from the +X-axis direction to the −X-axis direction or reversal from the −X-axis direction to the +X-axis direction (step S4).

Here, it is judged if the rotational directions of the servomotors 18, 19, and 20 are from the positive direction to the negative direction or from the negative direction to the positive direction.

This judgement can be easily made from the order of reversal of the signs since the position commands $r_x$, $r_y$, and $r_z$ are given by the sign-bearing pulse amount (movement pulse per predetermined time).

When the direction of rotation reverses from the positive direction to the negative direction, the corresponding backlash compensation amounts $D_{XX}$, $D_{YY}$, and $D_{ZZ}$ and the other axial compensation amounts $D_{XY}$, $D_{XZ}$, $D_{YX}$, $D_{YZ}$, $D_{ZX}$, and $D_{ZY}$ are obtained (step S5). Even when it reverses from the negative direction to the positive direction, similarly the corresponding backlash compensation amounts $D_{XX}$, $D_{YY}$, and $D_{ZZ}$ and the other axial compensation amounts $D_{XY}$, $D_{XZ}$, $D_{YX}$, $D_{YZ}$, $D_{ZX}$, and $D_{ZY}$ are obtained (step S6).

Normally, the backlash compensation amounts $D_{XX}$, $D_{YY}$, and $D_{ZZ}$ used are the same in magnitude, but reverse in sign between the positive direction and negative direction.

Next, these are output to the corresponding adders 8, 9, and 10 and the compensation amounts are added to the position commands $r_x$, $r_y$, and $r_z$ (step S7).

The method of determination of the other axial compensation amounts $D_{XY}$, $D_{XZ}$, $D_{YX}$, $D_{YZ}$, $D_{ZX}$, and $D_{ZY}$ will be explained next.

For example, when the positioning deviation $\delta_Z$ in the Z-axis direction between the ball end mill T and the workpiece W occurs with substantially the same magnitude and in the positive and negative directions such as with finishing by the above mentioned ball end mill T, the positioning deviation $\delta_Z$ is measured in advance and the other axial compensation amount $D_{XZ}$ canceling this out is stored in the position control apparatus 1.

At the above step S5 or S6, a sign is assigned to the other axial compensation amount $D_{XZ}$ in accordance with the direction of reversal and the result is output to the adder 10.

The other axial compensation amounts $D_{XY}$, $D_{XZ}$, $D_{YX}$, $D_{YZ}$, $D_{ZX}$, and $D_{ZY}$ can be determined from the amounts of the positioning deviations when actually machining. Alternatively, it is possible to use a laser interferometer or other position detecting means to control the feed in a predetermined axis and detect the positioning deviations in the other axes.

Depending on the structure of the machine, for example, the amounts of positioning deviations in the other axial directions differ between the case of reversal of the feed direction from the positive direction to the negative direction and the case of reversal of the feed direction from the negative direction to the positive direction. There are even cases where the compensation is insufficient with other axial compensation amounts of the same magnitude as explained above. For example, there may be cases where the amounts of positioning deviations differ depending on the direction of reversal according to the effect of gravity etc.

In such a case, values of other axial compensation amounts differing according to the direction of reversal are held in the position control apparatus 1.

Further, when the feed direction of the driven control axis reverses, the positioning deviations occurring in the directions of the other control axes may possibly change in accordance with the position of the driven control axis.

Figure 9:
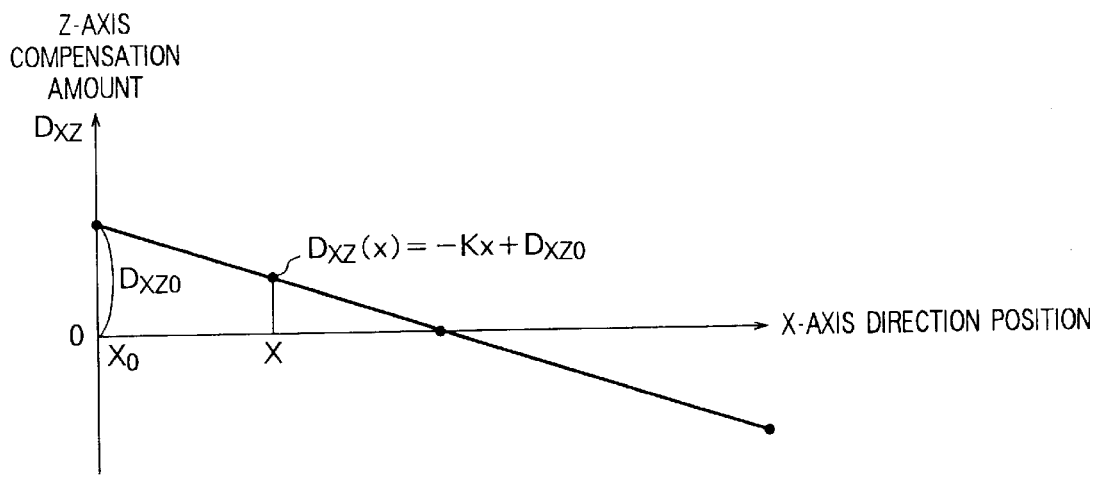
FIG. 9 is a view of an example of data on the compensation amounts in a numerical control console according to the present invention.

For example, when the other axial compensation amount $D_{XZ}$ changes linearly in accordance with a function of a position of the X-axis direction, that is, as shown in FIG. 9, for example, a position in the X-axis direction, the other axial compensation amount $D_{XZ}$ is calculated by the following formula (2) in the position control apparatus 1:

$$D_{XZ}(x) = -K \cdot x + D_{XZ0} \qquad (2)$$

Further, for example, the amount of the positioning deviation in the Z-axis direction may possibly differ at a plurality of positions of the X-axis direction.

Figure 10:
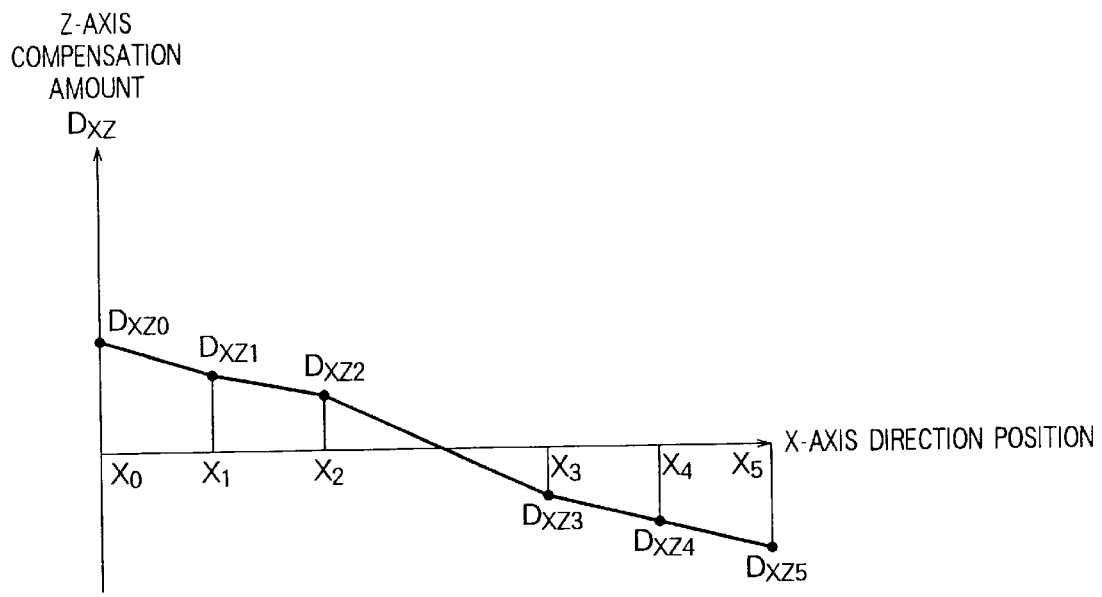
FIG. 10 is a view of another example of data on the compensation amounts in a numerical control console according to the present invention.

In this case, as shown in FIG. 10, the other axial compensation amount $D_{XZ}$ is held as a table in accordance with the plurality of positions of the X-axis direction.

Further, the other axial compensation amount $D_{XZ}$ at a plurality of points can be calculated by linear interpolation.

Further, for example, the amounts of the positioning deviations of the directions of the other control axes besides the control axis being driven may possibly change in accordance with the magnitude of the cutting force applied to the tool of the numerical control machine tool.

Figure 11:
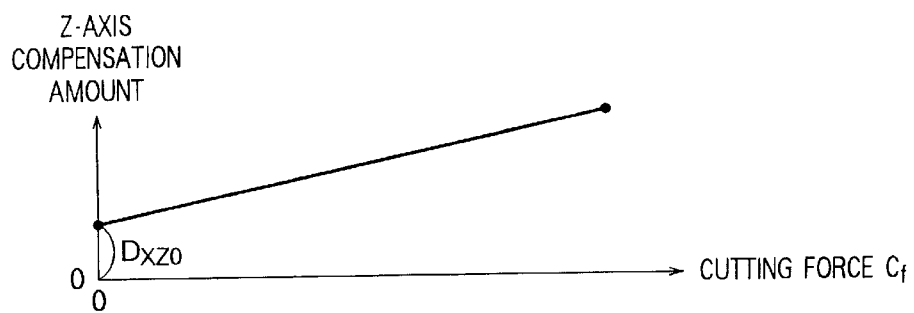
FIG. 11 is a view of still another example of data on the compensation amounts in a numerical control console according to the present invention.

In such a case, for example, as shown in FIG. 11, the other axial compensation amounts are made to change linearly in accordance with the magnitude of the cutting force. Alternatively, the other axial compensation amounts are made to change in steps in accordance with the magnitude of the cutting force.

The magnitude of the cutting force can for example be detected by a method such as detecting the drive current of the spindle motor driving the tool.

Further when the cutting force is not acting, that is, when machining is not being performed, the amounts of the positioning deviations in the directions of the other control axes may possibly also be smaller by the amount of the inaction of the cutting force.

In such a case, for example, the other axial compensation amount $D_{XZ0}$ shown in FIG. 11 may be made the other axial compensation amount.

After outputting the backlash compensation amounts and the other axial compensation amounts to the corresponding adders 8 to 10, the compensation amounts are cumulatively added to the past backlash compensation amounts and other axial compensation amounts $D_{XX}$, $D_{XY}$, $D_{XZ}$, $D_{YX}$, $D_{YY}$, $D_{YZ}$, $D_{ZX}$, $D_{ZY}$, and $D_{ZZ}$.

The cumulative values of the compensation amounts are managed to prevent deviations of the absolute positions of the different axial servomotors 18, 19, and 20 due to the backlash compensation amounts and the other axial compensation amounts. This is to correct the absolute positions of the different axial servomotors 18, 19, and 20 after the predetermined process has been completed.

Next, it is judged from the positional commands if the following machining operation has been completed (step S9).

This judgement may be made by judging that a predetermined machining process has been completed when position commands are not being input for the X-, Y-, and Z-axes.

Next, the above cumulative values are output as position commands of the corresponding control axes (step S10).

Due to this, it is possible to prevent deviations in the absolute positions of the different axial servomotors 18, 19, and 20.

Figure 12A:
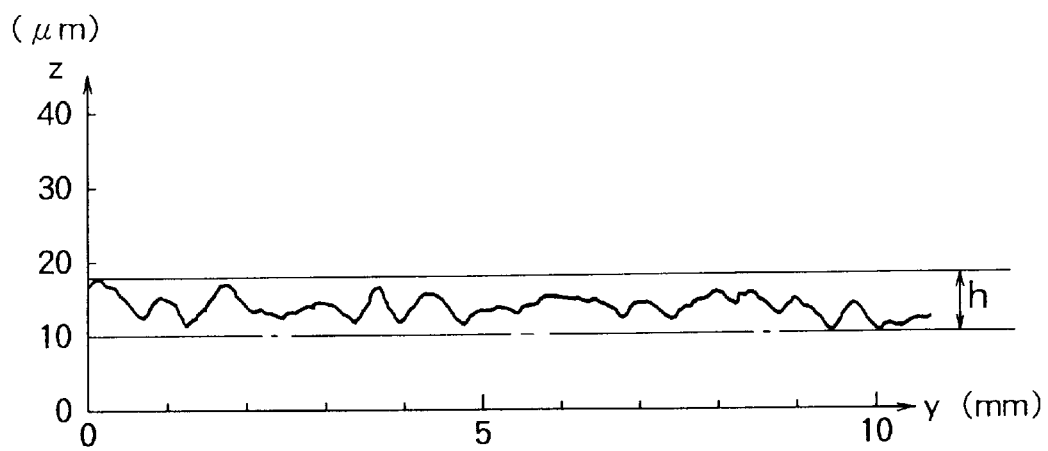
FIGS. 12A and 12B are views for explaining the result of machining when actually machining a workpiece, where
Figure 12B:
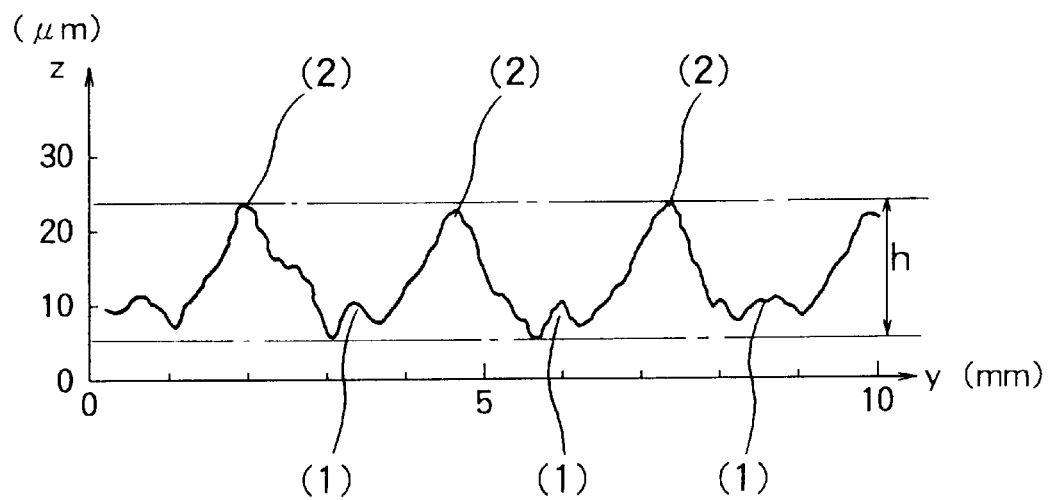

FIGS. 12A and 12B are views for explaining the result of machining when actually machining one surface of a die as a workpiece W, where FIG. 12A is a view of the case of use of a position control apparatus according to the present invention, while FIG. 12B is a view of the case of the related art.

The machining conditions are as follows: material of the die: FCD700 (SG), tool: ball end mill (carbide), tool diameter: 16 mm, spindle rotational speed: 4400 rpm, X-axis direction feed rate: 3800 mm/min, Y-axis direction pick feed amount P: 0.7 mm, and Z-axis direction depth of cut: 1 mm.

Further, in FIG. 12A, the Z-axis position command $r_z$ is corrected by adding the other axial compensation amount $D_{XZ}$, while the other position commands are not corrected.

Further, in FIG. 12B, due to the other axial compensation amount, the positioning deviation $\delta_Z$ in the Z-axis direction occurring between the ball end mill T and the workpiece W is about $\pm 9$ $\mu$m, so the magnitude of the other axial compensation amount $D_{XZ}$ is made 9 $\mu$m and a sign is assigned in accordance with the direction of reversal of the feed direction of the X-axis.

In FIG. 12B, when not correcting the amount of positioning deviation $\delta_Z$ in the Z-axis direction occurring between the ball end mill T and the workpiece W by the other axial compensation amount, the depth of cut in the Z-axis direction is large in the region (1) and the depth of cut is small in the region (2) so the surface roughness h deteriorates.

On the other hand, it is learned that according to the control by the numerical control console 1 according to the present embodiment, as shown in FIG. 12A, the surface roughness h is strikingly improved.

In this way, according to the present embodiment, in addition to the backlash compensation function for correcting the mechanical error in the direction of a control axis occurring when reversing the feed direction of the direction of the control axis, it becomes possible to correct positioning errors occurring in directions other than the direction of the control axis when reversing the feed directions and it is possible to correct the two-dimensional or three-dimensional positioning errors occurring in the controlled object of the numerical control machine tool etc. two-dimensionally or three-dimensionally.

As a result, for example, when finishing a surface of a workpiece W by the ball end mill T in a machining center, it is possible to improve the surface roughness of the machined surface.

The present invention is not limited to the above embodiment.

In the above embodiment, the explanation was made of the case of application of the present invention to a controlled object in the case of use of the semi-closed feedback system as a control system, but the present invention is not limited to the semi-closed feedback system and may also be applied to controlled objects using the full-closed feedback system.

When using the full-closed feedback system, there is ideally no backlash or other mechanical error in the direction of the control axis being driven, but positioning error occurs in directions of control axes other than the control axis being driven.

In the case of such a controlled object, it is sufficient to correct the positions by the other axial compensation amounts without correcting the positions by the above backlash compensation amount.

Further, in the above embodiment, the explanation was made of the case of use of a servomotor as the driving means and of a lead screw and a female thread as the feed mechanism, but for example the present invention may also be applied to the case of direct drive by a linear motor etc. without use of a feed mechanism.

Further, in the above embodiment, the explanation was made of the case of three control axes, but the present invention can be similarly applied to controlled objects having even more control axes.

Second Embodiment

Figure 13:
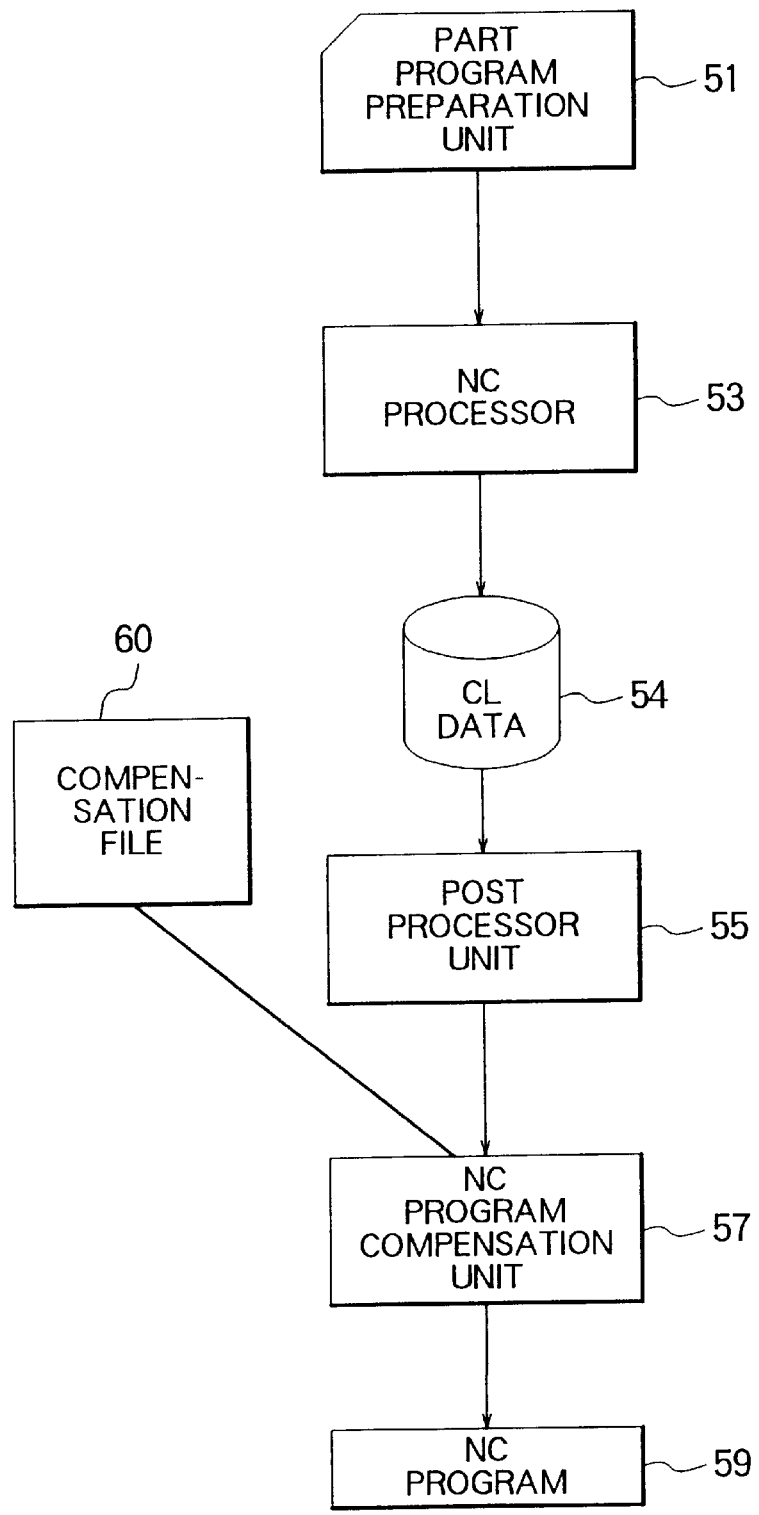
FIG. 13 is a view of the configuration of a numerical control program preparation apparatus according to the present invention.

FIG. 13 is a view of the configuration of a numerical control program preparation apparatus according to the present invention.

The numerical control program preparation apparatus according to the present embodiment has a part program preparation unit 51, a numerical control processor unit 53, a post processor unit 55, a numerical control program compensation unit 57, and a compensation amount file unit 60.

Note that the numerical control program preparation apparatus of the above configuration is for example realized by software in a personal computer, work station, or other computer apparatus.

The part program preparation unit 51 prepares a program for designating the movement of a tool of the numerical control machine tool for machining a workpiece to define the shape of the product and running the numerical control machine tool.

The numerical control processor unit 53 reads the above part program and prepares the cutter location data (CL data 54) of the above tool based on the part program.

The post processor unit 55 reads the CL data 54 and converts it to symbols and a format suited to the specifications of the numerical control machine tool being used to enable use of the CL data 54 for the actual machining. The data output from the post processor unit 55 is the numerical control program before compensation.

These part program preparation unit 51, numerical control processor unit 53, and post processor unit 55 are functions provided in a general CAD system or automatic programming system.

The numerical control program compensation unit 57 corrects the numerical control program output from the post processor unit 55.

The compensation file unit 60 holds the information for processing performed at the numerical control program compensation unit 57.

Figures 14, 15:
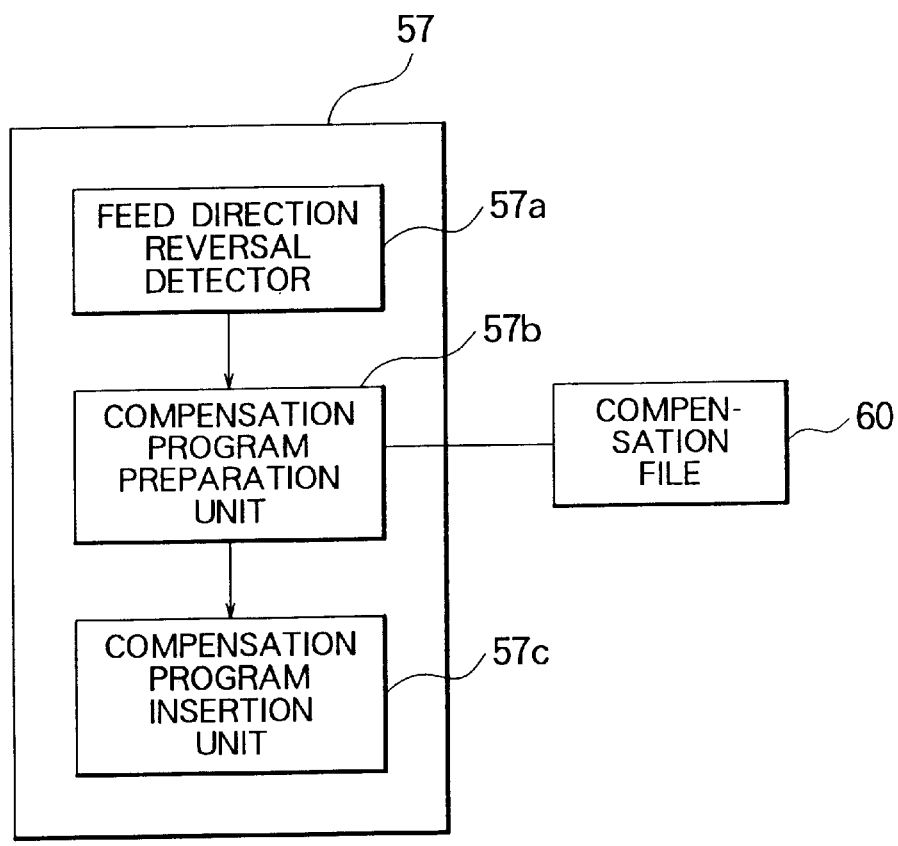
FIG. 14 is a view for explaining the configuration of a numerical control program compensation unit in a numerical control program preparation apparatus according to the present invention.
FIG. 15 is a view of an example of a numerical control program output from a post processor unit in a numerical control program preparation apparatus according to the present invention.

FIG. 14 is a view for explaining the configuration of a numerical control program compensation unit 57.

The numerical control program compensation unit 57 has a feed direction reversal detector 57a, a compensation program preparation unit 57b, and a compensation program insertion unit 57c.

The feed direction reversal detector 57a detects the command program, contained in the numerical control program output from the post processor unit 55, for controlling the feed of one control axis and reversing the feed direction of the one control axis.

The compensation program preparation unit 57b prepares a compensation program for correcting the positioning errors with respect to the target positions in the directions of the other control axes when reversing the feed direction of one control axis in accordance with the detection of reversal of the one control axis in the feed direction reversal detector 57a.

The compensation program preparation unit 57b prepares a compensation program based on the information held in the compensation file unit 60.

The compensation program insertion unit 57c inserts the compensation program prepared in the compensation program preparation unit 57b into a command program, contained in the above numerical control program, for reversing the feed direction of the one control axis.

FIG. 15 is a view of an example of a numerical control program output from the post processor unit.

G01 of the programs (1) to (5) illustrated in FIG. 15 is a code instructing a linear cutting feed. G01 is a code expressing the current position as a distance from one position before, F is a code instructing the feed rate, and G00 is a code instructing fast feed.

Note that the coordinate system is defined by a Cartesian coordinate system of X-, Y-, and Z- axes. The positive and negative directions of the axes are determined about the origin of the coordinates defined as the intersection of the X-, Y-, and Z- axes.

For example, the X-axis is the direction of movement of the cutting tool in the plane perpendicular to the Z-axis. The direction where the cutting tool moves away from the workpiece is the positive direction. The Y-axis is the direction intersecting the X-axis and the Z-axis at right angles. The Z-axis is the direction of the spindle of the numerical control machine tool. The direction moving away from the workpiece is considered the positive direction.

The program (1) is a command for making the cutting tool move relative to the workpiece in the X-axis direction at a feed rate of 300 mm/min by a distance of 100 mm from the previous position.

The program (2) is a command for fast feeding in the +Y-axis direction at a distance of 0.5 mm.

The program (3) is a command for making the cutting tool move relative to the workpiece in the –X-axis direction at a feed rate of 300 mm/min by a distance of 100 mm from the previous position.

The program (4) is a command for fast feeding the cutting tool with respect to the workpiece in the +Y-axis direction at a distance of 0.5 mm.

The program (5) is a command for making the cutting tool move relative to the workpiece in the −X-axis direction at a feed rate of 300 mm/min by a distance of 100 mm from the previous position.

Figure 16:
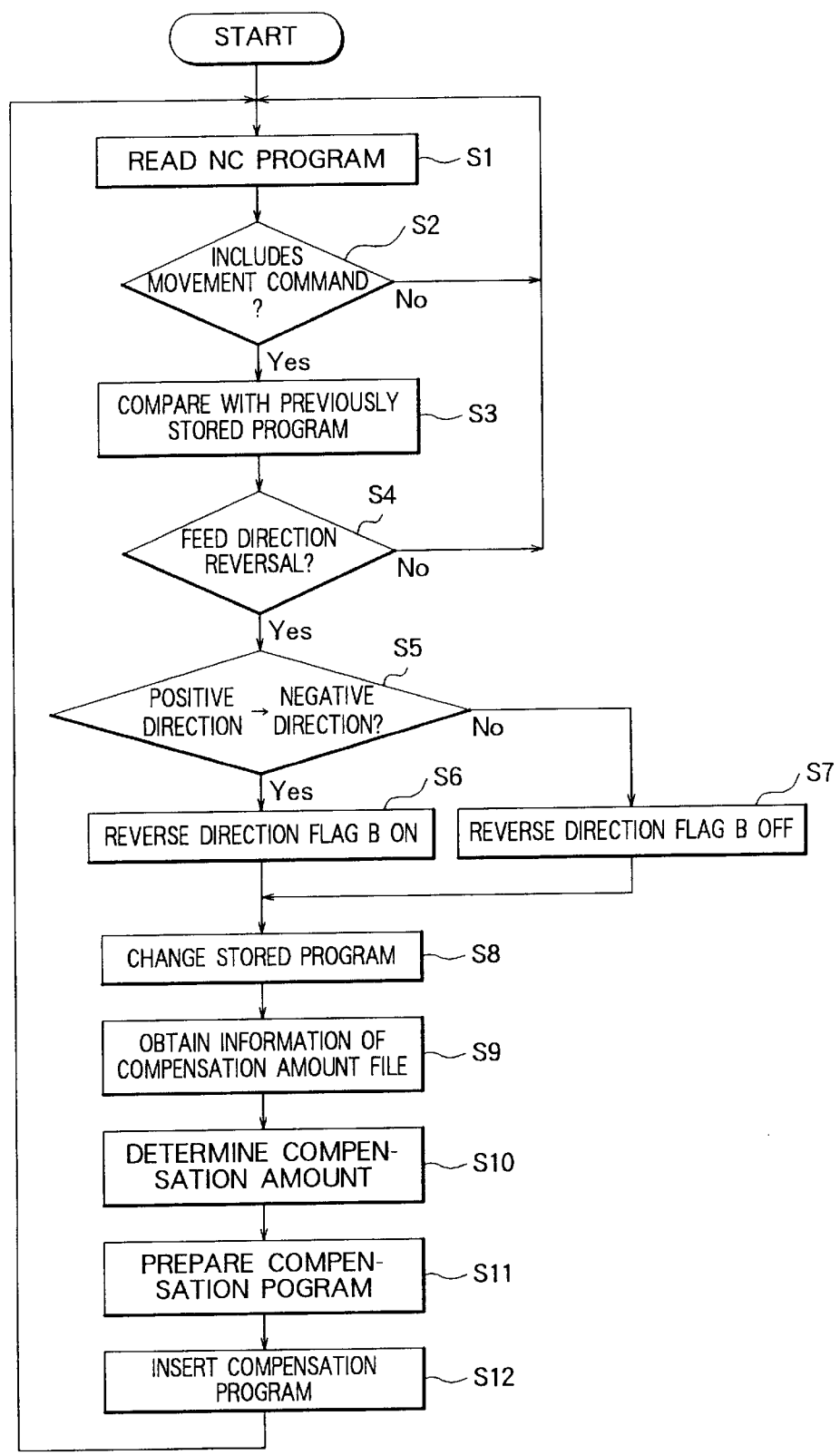
FIG. 16 is a flow chart of an example of the processing routine of a numerical control program compensation unit in a numerical control program preparation apparatus according to the present invention.

An example of the processing routine of the above numerical control program compensation unit 57 will be explained next based on the flow chart shown in FIG. 16.

The numerical control program including the program shown in FIG. 15 is successively read in the numerical control program compensation unit 57 (step S1).

The feed direction reversal detector 57a judges if the read programs are programs having the G00, G01, and other codes instructing the movement of the cutting tool (step S2).

Next, when a program read in the feed direction reversal detector 57a is a program having G00, G01, and other codes instructing movement of the cutting tool, the program is compared with the previously stored program similarly having the G00, G01, and other codes instructing the movement of the cutting tool. Note that this comparison is made for each axial direction.

For example, in the numerical control program illustrated in FIG. 15, the program (1) is made the previously stored program at step S3.

When the program (3) is read at step S1, the program (3) and the program (1) are compared.

Program (1) is a command for movement of the cutting tool in the +X-axis direction. The program (3) is a command for movement of the cutting tool in the −X-axis direction. Therefore, reversal of the feed direction of the X-axis is judged from the programs (1) and (3) (step S4).

Next, when reversal of the feed direction is detected, the direction of the reversal is detected (step S5).

That is, for example, it is judged if the reversal of the feed direction is from the +X-axis direction to the −X-axis direction or the opposite.

If it is reversal of the feed direction from the +X-axis direction to the −X-axis direction, the reversal direction flag B provided in the numerical control program compensation unit 57 is set (step S6). If opposite, the reversal direction flag B is reset (step S7).

Next, the stored program is updated (step S8).

In this example, the previously stored program (1) is updated to the program (3).

Next, the compensation program preparation unit 57b obtains the predetermined information for preparing the compensation amount from the compensation amount file unit 60 (step S9).

This information is for example the value of the compensation amount D etc. Details will be discussed later.

Next, the compensation amount D is determined based on information obtained from the compensation amount file unit 60 (step S10).

The compensation amount is a compensation amount for correcting the positioning deviations of the cutting tool with respect to the workpiece occurring in the directions of the other Y- and Z-axes at the time of reversal of the X-axis feed direction.

Details of the method of determination of the compensation amounts will be explained later.

If the compensation amounts for correcting the positioning deviations of the cutting tools with respect to the workpiece occurring in the Y- and Z-axis directions determined at step S10 are made $D_{XY}$ and $D_{XZ}$, a program is prepared for outputting these compensation amounts as the amounts of movement in the Y- and Z-axis directions (step S11).

Specifically, for example, as shown in FIG. 17, a program (H) is prepared using the code G00 for instructing fast feed to make the controlled object move by exactly the compensation amounts $D_{XY}$ and $D_{XZ}$ in the Y- and Z-axis directions.

Next, the program (H) prepared at step S11 is inserted between the programs (2) and (3) as shown in for example FIG. 18.

Note that since there is a reversal of feed direction of the X-axis in the relation between the programs (3) and (5) illustrated in FIG. 15 as well, a similar compensation program (H) is inserted between the programs (4) and (5).

By repeating the above processing, it is possible to correct the numerical control program.

Further, while the case of the X-axis was shown above as an example, similar processing is performed for the Y-axis and the Z-axis.

Next, an explanation will be given of the content of the compensation amount file unit 60 and the method of determination of the compensation amounts.

For example, when positioning a controlled object to a target position in the direction of one control axis in a numerical control machine tool having control axes in the X-, Y-, and Z-axis directions, positioning deviations can occur with respect to the target position in the directions of the other control axes. In addition, backlash and other mechanical positioning deviations can occur in the direction of the one control axis.

Accordingly, the amounts of positioning deviations which can occur in the X-, Y-, and Z-axis directions can be expressed as shown in FIG. 19B.

The positioning deviations $\delta_{XX}$, $\delta_{YY}$, and $\delta_{ZZ}$ are backlashes and other mechanical errors occurring in the directions of the control axes at the time of reversal of the feed directions of the control axes.

The positioning deviations $\delta_{XY}$ and $\delta_{XZ}$ are amounts of positioning deviations occurring in the Y- and Z-axis directions at the time of reversal of the feed direction of the X-axis direction.

The positioning deviations $\delta_{ZX}$ and $\delta_{ZY}$ are amounts of positioning deviations occurring in the X- and Z-axis directions at the time of reversal of the feed direction of the Y-axis direction.

The positioning deviations $\delta_{ZX}$ and $\delta_{ZY}$ are amounts of positioning deviations occurring in the X- and Y-axis directions at the time of reversal of the feed direction of the Z-axis direction.

FIG. 19A is a view listing compensation amounts for correcting the amounts of positioning deviations.

The compensation amounts $D_{XX}$, $D_{YY}$, and $D_{ZZ}$ shown in FIG. 19A (hereinafter referred to as "backlash compensation amounts") are held in the position control apparatus since a numerical control console for controlling a numerical control machine tool is normally provided with a backlash compensation function.

In this embodiment, the compensation amounts $D_{XY}$, $D_{XZ}$, $D_{YX}$, $D_{YZ}$, $D_{ZX}$, and $D_{ZY}$ (hereinafter referred to as other axial compensation amounts) are determined and the above compensation program is prepared.

For example, the other axial compensation amounts $D_{XY}$ and $D_{XZ}$ are compensation amounts for correcting the positioning errors with respect to the target positions (relative positions between cutting tool and workpiece) in the Y-axis and the Z-axis directions when the feed direction of the X-axis is reversed.

The exact same thing applies as the X-axis to the other axial compensation amounts $D_{YX}$, $D_{YZ}$, $D_{ZX}$, and $D_{ZY}$.

The method of determination of the other axial compensation amounts $D_{XY}$, $D_{XZ}$, $D_{ZY}$, $D_{ZX}$, and $D_{ZY}$ will be explained next.

For example, the positioning deviations δ of the other axial directions occurring when reversing the feed direction of one control axis in a numerical control machine tool may possibly be substantially constant.

In this case, the other axial compensation amounts $D_{XY}$, $D_{XZ}$, $D_{YX}$, $D_{YZ}$, $D_{ZX}$, and $D_{ZY}$ are held in the compensation amount file unit 60 as constant values. These values are used as the compensation amounts of the compensation program as shown in FIG. 6 for example.

Note that the other axial compensation amounts $D_{XY}$, $D_{XZ}$, $D_{YX}$, $D_{YZ}$, $D_{ZX}$, and $D_{ZY}$ may be determined from the positioning deviations δ when actually machining by a numerical control machine tool. Alternatively, it is possible to use a laser interferometer or other position detecting means to control the feed of predetermined axes and detect the positioning deviations δ of the other axes.

In a numerical control machine tool, for example, there may be cases where the magnitude is substantially the same, but the direction of the positioning deviation δ differs according to the direction of the reversal of the feed direction of one control axis.

In this case, the other axial compensation amounts $D_{XY}$, $D_{XZ}$, $D_{YX}$, $D_{YZ}$, $D_{ZX}$, and $D_{ZY}$ are held at both the positive and negative values. The compensation program preparation unit 57b selects and decides on the corresponding other axial compensation amounts in accordance with the status of the above reversal direction flag B.

Depending on the structure of the numerical control machine tool, for example, the amounts of positioning deviation in the other axial directions differ between the case of reversal of the feed direction from the positive direction to the negative direction and the case of reversal of the feed direction from the negative direction to the positive direction. There are even cases where the compensation is insufficient with other axial compensation amounts of the same magnitude as explained above. For example, there may be cases where the amounts of positioning deviation differ depending on the direction of reversal according to the effect of gravity etc.

In such a case, values of other axial compensation amounts differing according to the direction of reversal are held in the compensation amount file unit 60. The compensation program preparation unit 57b selects and decides on the corresponding other axial compensation amounts in accordance with the status of the above reversal direction flag B.

Further, when the feed direction of the driven control axis reverses, the positioning deviations occurring in the directions of the other control axes may possibly change in accordance with the position of the driven control axis.

For example, when the amount of positioning deviation $δ_{XZ}$ in the Z-axis direction occurring when there is a reversal in the feed direction of the X-axis is expressed as a function of the position of the X-axis direction, as explained in FIG. 9, there may possibly be a linear change in accordance with the position in the X-axis direction.

In this case, the proportional coefficient K and the other axial compensation amount $D_{XZ0}$ at a reference position in the X-axis direction are stored in the compensation amount file unit 60 and the other axial compensation amount $D_{XZ}$ is calculated by the above formula (1).

Note that the compensation program preparation unit 57b cumulatively adds the amounts of movements of the directions of the control axes and holds the current positions from the origin.

Further, as explained in FIG. 10, the positioning deviation $δ_{XZ}$ of the Z-axis direction may possibly differ at a plurality of positions in the X-axis direction.

In this case, the other axis control amount $D_{XZ}$ is held in the compensation amount file unit 60 corresponding to a plurality of positions in the X-axis direction.

Further, the other axial compensation amount $D_{XZ}$ between a plurality of points can be calculated by linear interpolation.

Further, when the cutting force is not acting on the cutting tool, that is, when machining is not being performed, the amounts of the positioning deviations of the directions of the other control axes may possibly also be smaller by the amount of the inaction of the cutting force.

In such a case, for example, the other axial compensation amount $D_{XZ}$ held in the compensation amount file unit 60 is stored for machining and not machining.

The compensation program preparation unit 57b switches the other axial compensation amount $D_{XZ}$ used in accordance with the content of the instructed codes.

Whether machining is being performed or not being performed can be judged by the content of the codes in the numerical control program. For example, the code G01 is a code for instructing cutting feed, so when the movement command uses the code G01, it may be judged that machining is being performed. On the other hand, it is possible to judge that machining is not being performed when the code instructs fast feed such as G00.

A numerical control console to which the numerical control program prepared by the above numerical control program preparation apparatus is applied is one of a configuration of the position control apparatus 1 illustrated in FIG. 1 without the function of outputting the other axial compensation amounts from the X-, Y-, and Z-axis position compensation units 4, 5, and 6.

Next, an explanation will be given of the operation of the numerical control console and the machining center using a numerical control program prepared by the above numerical control program preparation apparatus.

First, the numerical control program prepared by the numerical control program preparation apparatus is read into the numerical control console 1 through for example a numerical control tape, floppy disk, or other storage medium and stored in the RAM 23.

The numerical control program analysis and command distribution unit 3 analyzes and processes the above numerical control program and distributes the position commands $r_x$, $r_y$, and $r_z$ to the control axes.

The position commands $r_x$, $r_y$, and $r_z$ distributed to the control axes are sequentially input to the X-, Y-, and Z-axis position command compensation units 4 to 6 as amounts of movement per predetermined time.

Next, the different axial position command compensation units 4 to 6 detect if the feed directions of the axes have reversed based on the input amounts of movement.

Whether or not the directions have reversed is judged by detecting whether the signs of the position command pulses have reversed.

Accordingly, when the signs of a previously input amount of movement and a currently input amount of movement differ, it is judged that a command is one with a reversal of feed direction.

When the feed direction of the control axis reverses, the corresponding backlash compensation amounts are output from the different axial position compensation units 4 to 6 to the corresponding adders 8 to 10.

For example, when the feed direction in the X-axis direction reverses, the backlash in the X-axis direction is corrected by the backlash compensation amount $D_{XX}$ through the X-axis servo controller 12.

At this time, the position commands $r_y$ and $r_z$ are output from the numerical control program analysis and command distribution unit 3 so as to correct the positioning errors in the Y-axis direction and the Z-axis direction in addition to the backlash compensation in the X-axis direction.

The position commands $r_y$ and $r_z$ are obtained by conversion of the other axial compensation amounts $D_{XY}$ and $D_{XZ}$ to position commands in the numerical control program analysis and processing/command distribution unit 3.

By the output of the position commands $r_y$ and $r_z$ to the Y- and Z-axis servo controllers 13 and 14, the positioning deviations from the target positions in the Y- and Z-axis directions are corrected.

Note that while the explanation was made with reference to the case of reversal of the feed direction in the X-axis, the same applies to the case of reversal of the feed directions in the Y- and Z-axes.

As explained above, according to the numerical control program preparation apparatus according to the present invention, by driving the numerical control machine tool by a numerical control program corrected in advance, it is possible to correct two-dimensionally and three-dimensionally positioning deviations from the target positions occurring in the directions of the other control axes when reversing the feed direction of one control axis.

As a result, it is possible to improve the machining accuracy of workpieces by a numerical control machine tool.

Further, according to the present embodiment, positioning deviations from target positions occurring in the directions of other axes when reversing the feed direction of one control axis can be corrected even without the numerical control console controlling a numerical control machine tool having a function of correcting such positioning deviations.

Accordingly, according to the present embodiment, it is possible to two-dimensionally or three-dimensionally correct positioning deviations from target positions occurring in directions of other control axes without requiring any changes to be made to existing numerical control consoles.

As a result, it is possible to improve the surface roughness of the machined surface when for example finishing a surface of a workpiece W by a ball end mill T in a machining center.

The present invention is not limited to the above embodiments.

Figure 20:
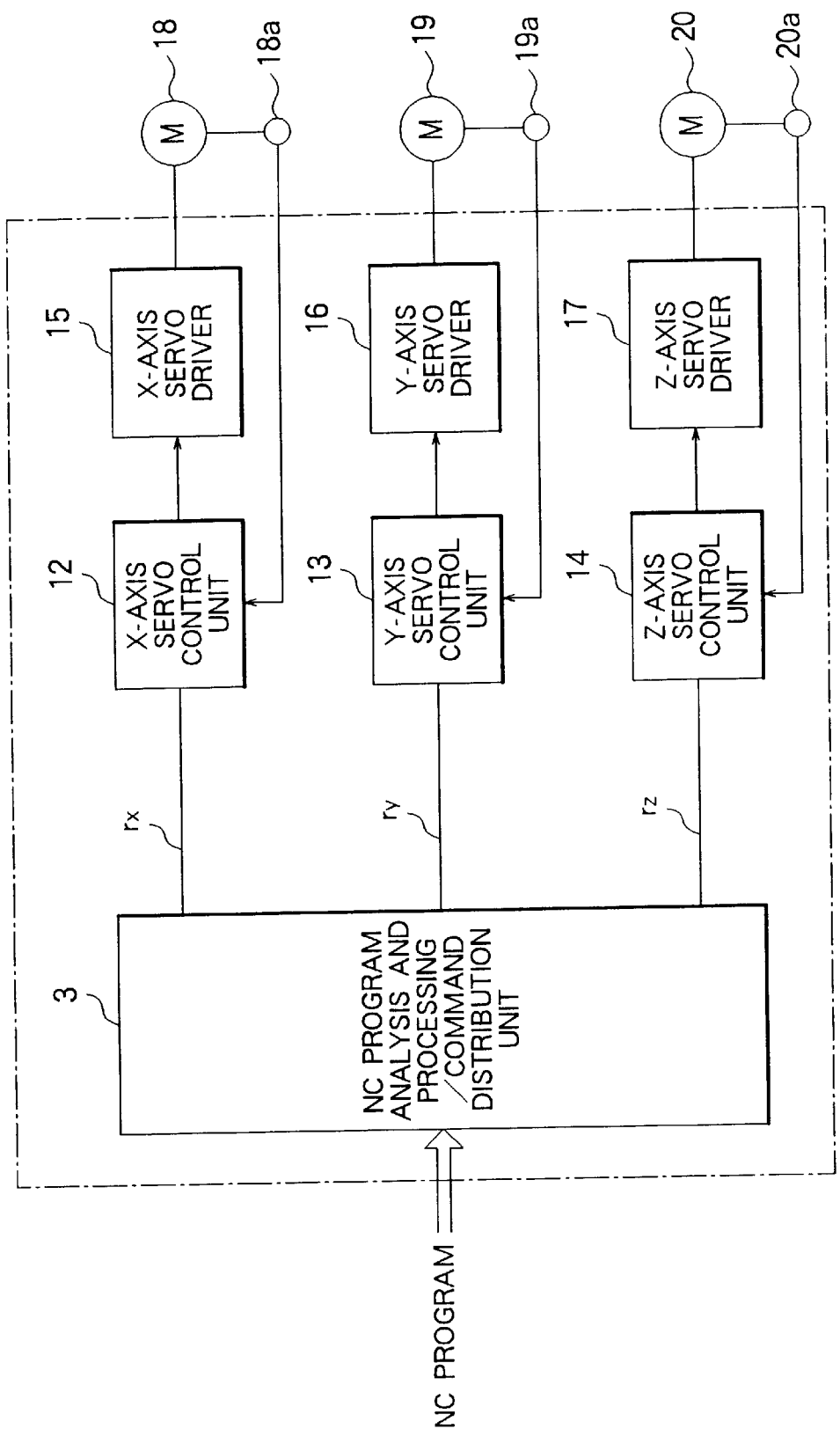
FIG. 20 is a view of the configuration of another example of a numerical control console to which a numerical control program prepared by the numerical control program preparation system according to the present invention is applied.

In the above embodiments, the explanation was given with reference to the case of a backlash compensation function in the numerical control console to which a numerical control program prepared by numerical control program preparation apparatus according to the present invention was applied, but for example it is also possible to correct backlash and correct positioning deviations occurring in other axes in the case of application to a numerical control console of a configuration not provided with a backlash compensation function shown in FIG. 20.

Figure 21:
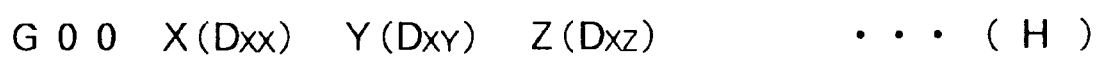

In this case, for example, as the compensation program to be inserted when the feed direction of the X-axis reverses, a program added with the backlash compensation amount $D_{XX}$ shown in FIG. 21 is prepared.

Using the backlash compensation amount $D_{XX}$ and the other axial compensation amounts $D_{XY}$ and $D_{XZ}$, it becomes possible to correct positioning deviations from the target positions occurring in the directions of the three X-, Y-, and Z-axes when reversing the feed direction of the X-axis.

Further, it is not necessary to use all of the compensation amounts $D_{XY}$, $D_{XZ}$, $D_{YX}$, $D_{ZX}$, and $D_{ZY}$. Any single one of them may be used as well.

Further, in the above embodiments, the explanation was made of the case of application to a numerical control machine tool having three axes, that is, X-, Y-, and Z-axes, but the present invention may also be applied to a numerical control machine tool having two control axes or a numerical control machine tool having four or more control axes.

According to the present invention, it becomes possible to correct positioning errors with respect to the target positions occurring in the directions of other axes than the direction of one control axis of a controlled object having a plurality of control axes when reversing the feed direction of that one control axis and therefore it becomes possible to two-dimensionally or three-dimensionally correct the positioning errors with respect to the target positions of the controlled object.

Further, according to the present invention, it becomes possible to correct the positioning errors occurring in the directions of the other control axes than the one control axis of a numerical control machine tool having a plurality of control axes when reversing the feed direction of the one control axis. As a result, it is possible to improve the machining accuracy of the workpiece by the numerical control machine tool.

Further, according to the numerical control program preparation apparatus based on the present invention, high accuracy processing becomes possible without changing existing numerical control consoles since a corrected numerical control program is downloaded to the numerical control console. Working the invention therefore becomes extremely easy.

What is claimed is:

1. A position control apparatus comprising:

a target position setting means for setting a target position of a direction of a control axis of a controlled object, the controlled object being able to move in a plurality of directions of control axes by a moving means;

a position control means for independently positioning said controlled object to a target position of the direction of the control axis, the control axis set by said target position setting means; and a first position correcting means for correcting the target positions of the directions of other control axes, the first position correcting means compensates amounts by correcting positioning deviation in directions of other control axes occurring, when positioning the controlled object to a first target position of the direction of one control axis among the plurality of control axes, and then reversing the feed direction from that first target position and positioning to a second target position.

2. A position control apparatus as set forth in claim 1, wherein said moving means comprises:
   a plurality of driving means for supplying drive power to a moving part serving as a controlled object;
   a feed mechanism for linking said moving part and said driving means and transmitting the drive power from the driving means to said moving part; and
   a position detecting means for detecting a position of said moving part or driving means.

3. A position control apparatus as set forth in claim 1, further comprising a second position correcting means for outputting to said position control means a compensation command for compensation of a target position of the direction of the one control axis of the controlled object when reversing the feed direction of the one control axis of the controlled object.

4. A position control apparatus as set forth in claim 1, wherein said first position correcting means comprises a reversal detecting means for detecting reversal of the feed direction of the control axis based on a first and a second target position for said one control axis.

5. A position control apparatus as set forth in claim 1, wherein said first position correcting means holds in advance compensation amounts for correcting the target positions of the directions of the other control axes.

6. A position control apparatus as set forth in claim 1, further comprising:
   a program analysis and processing unit for analyzing and processing a program serving as control information for controlling the positioning in the directions of the control axes; and
   a position command distribution unit for distributing position command commands for each control axis obtained in said program analysis and processing unit as amounts of movement per predetermined time to the position control means.

7. A position control apparatus as set forth in claim 1, wherein:
   said controlled object is a numerical control machine tool comprises a plurality of control axes able to position a workpiece and tool at target positions; and
   said first position correcting means comprises a means for calculating compensation amounts for correcting target positions of other control axis directions in accordance with cutting force applied to the tool.

8. A position control apparatus as set forth in claim 1, wherein said first position correcting means holds the compensation amounts for correcting the target positions of the other control axes as functions of the position of the direction of the one control axis.

9. A position control apparatus as set forth in claim 1, wherein said first position correcting means holds compensation amounts for correcting target positions of other control axes discretely for a plurality of positions in the direction of the one control axis and interpolates the compensation amounts to calculate compensation amounts in accordance with the positions in the direction of the one control axis.

10. A position control apparatus as set forth in claim 1, wherein said first position correcting means holds cumulative values of the output compensation amounts and outputs the cumulative values as control commands to the corresponding control axes after a predetermined process is ended.

11. A position control apparatus as set forth In claim 1, wherein
   said controlled object is a numerical control machine tool comprises a plurality of control axes able to move a workpiece and tool as controlled objects to any positions; and
   said first position correcting means comprises a means for changing the compensation amounts for correcting target positions in other control axes between times of machining the workpiece by the numerical control machine tool and not machining it.

12. A position control apparatus as set forth in claim 1, wherein
   said controlled object comprises a spindle for driving a rotary tool provided in the Z-axis direction, a first moving part provided at the spindle and guided to be able to move in the Z-axis direction and the Y-axis direction, Z-axis and Y-axis lead screws provided along the Z-axis direction and the Y-axis direction and screwed into threaded portions formed in the first moving part, Z-axis and Y-axis servomotors for driving said lead screws, a second moving part for clamping the workpiece guided to be able to move in the X-axis direction, an X-axis lead screw provided along the X-axis direction and screwed into a threaded portion formed in the second moving part, an X-axis servomotor for driving said X-axis lead screw, and first to third rotational position sensors for detecting rotational amounts of said X-, Y-, and Z-axis servomotors;
   said position control means sends the workpiece mounted on the second moving part in the positive direction of the X-axis to the first target position, reverses the feed direction, and positions the workpiece to the second target position; and
   the first position correcting means corrects one target position among the Z-axis direction and Y-axis direction of the front end of the rotary tool when moving from the first target position to the second target position.

13. A position control method comprising:
   positioning a controlled object, able to be moved in a plurality of directions of control axes to a first target position of the direction of one control axis among the plurality of control axes and then reversing the feed direction from that first target position and positioning to a second target position;
   detecting a reversal of a feed direction of one control axis; and
   correcting the target position of the directions of the other control axes by compensation amounts for correcting positioning deviation in directions of other control axes occurring when reversing the feed direction of one control axis.

14. A position control method as set forth in claim 13, further comprising measuring compensation amounts based on the properties of the machine.

15. A position control method as set forth in claim 13, further comprising correcting a target position in the direction of the one control axis in accordance with detection of reversal of the feed direction of the one control axis of the controlled object.

16. A method of preparation of a numerical control program for controlling a numerical control machine tool comprising a controlled object able to be moved in directions of a plurality of control axis by moving means,
   said method of preparation of a numerical control program comprising
      preparing a main numerical control program for controlling the driving of said controlled object; and inserting into a command program, contained in said main numerical control program, for driving one control axis to position said controlled object to a first target position and to reverse the feed direction and position the second target position, a compensation program for correcting the target positions in the directions of the other control axes of the controlled object to correct the main numerical control program.

17. A method of preparation of a numerical control program as set forth in claim 16, further comprising measuring in advance compensation amounts to be set in said compensation program based on mechanical properties of said numerical control machine tool.

18. A method of preparation of a numerical control program as set forth in claim 16, wherein said correcting the numerical control program further comprises inserting a compensation program for correcting a target position in the feed direction of the one control axis.

19. A numerical control program preparation apparatus comprising:

a numerical control program preparing means for preparing a numerical control program for controlling the positioning of a controlled object, able to be moved in directions of a plurality of control axes by a moving means, of a numerical control machine tool which has the controlled object;

a detecting means for detecting a command program, included in the numerical control program, for positioning said controlled object to a first target position in the direction of one control axis and then reversing the feed direction and positioning to a second target position; and a numerical control program correcting means for inserting into the detected command program a compensation program for correcting the target positions in the directions of the other control axes of the controlled object when reversing the feed direction of the one control axis.

20. A numerical control program preparation apparatus according to claim 19, wherein said numerical control program correcting means holds said compensation amounts as values measured in advance based on the mechanical properties of said numerical control machine tool.

21. A numerical control program preparation apparatus according to claim 19, wherein said numerical control program correcting means holds compensation amounts in said compensation program as functions of a position of the feed direction of said one control axis.

22. A numerical control program preparation apparatus according to claim 19, wherein said numerical control program correcting means holds compensation amounts in said compensation program discretely for a plurality of positions in the direction of the one control axis, and interpolates the discretely held compensation amounts to calculate compensation amounts in accordance with the position in the direction of the one control axis.

23. A numerical control program preparation apparatus according to claim 19, wherein said numerical control program correcting means comprises a means for changing the compensation amounts for correcting the control commands of the other control axes between times of machining the workpiece by the numerical control machine tool and not machining it.

24. A method of control of a numerical control machine tool comprising:

preparing a numerical control program for running a numerical control console for controlling the positioning of a controlled object, able to be moved in directions of a plurality of control axes by a moving means, of a numerical control machine tool having said controlled object;

correcting the numerical control program, included in said numerical control program, by inserting into a command program for positioning said controlled object to a first target position of the direction of one control axis among a plurality of control axes and then reversing the feed direction and positioning it at a second target position, a compensation program for correcting the target positions in directions of other control axes of the controlled object;

for downloading the corrected numerical control program to the numerical control console, and for controlling the drive of the numerical control machine tool in accordance with the numerical control program downloaded to the numerical control console.

25. A method of control of a numerical control machine tool as set forth in claim 24, wherein said controlling the drive of the numerical control machine tool comprises correcting the positioning error in the direction of the control axis caused when reversing the feed direction of the one control axis; and both target positions of the one control axis direction and other control axis directions are corrected.

* * * * *